(12) United States Patent
Shimotsu et al.

(10) Patent No.: US 8,449,202 B2
(45) Date of Patent: May 28, 2013

(54) OPTICAL CONNECTOR

(75) Inventors: Akihiro Shimotsu, Ebina (JP);
Masayuki Arai, Yokohama (JP)

(73) Assignee: Molex Incorporated, Lisle, IL (US)

( * ) Notice: Subject to any disclaimer, the term of this patent is extended or adjusted under 35 U.S.C. 154(b) by 255 days.

(21) Appl. No.: 12/997,707

(22) PCT Filed: Jun. 11, 2009

(86) PCT No.: PCT/US2009/047003
§ 371 (c)(1),
(2), (4) Date: Dec. 13, 2010

(87) PCT Pub. No.: WO2009/152303
PCT Pub. Date: Dec. 17, 2009

(65) Prior Publication Data
US 2011/0091163 A1    Apr. 21, 2011

(30) Foreign Application Priority Data
Jun. 11, 2008   (JP) ................. 2008-152371

(51) Int. Cl.
*G02B 6/38*     (2006.01)
*H01R 33/945*   (2006.01)

(52) U.S. Cl.
USPC ............... 385/76; 385/52; 385/83; 385/101; 385/92; 439/577

(58) Field of Classification Search
USPC ............ 385/53, 52, 101, 76, 77, 78, 88, 89, 385/92, 93, 94, 139, 55, 65, 70, 71, 75, 83; 439/577
See application file for complete search history.

(56) References Cited

U.S. PATENT DOCUMENTS

| | | | |
|---|---|---|---|
| 4,767,181 A * | 8/1988 | McEowen | 385/78 |
| 5,188,539 A | 2/1993 | Langdon | |
| 6,033,125 A * | 3/2000 | Stillie et al. | 385/75 |
| 6,520,686 B1 * | 2/2003 | Kiani | 385/54 |
| 6,678,448 B2 * | 1/2004 | Moisel et al. | 385/101 |
| 6,736,546 B2 * | 5/2004 | Kiani et al. | 385/59 |

(Continued)

FOREIGN PATENT DOCUMENTS

| | | |
|---|---|---|
| DE | 101 39 307 A1 | 3/2003 |
| JP | 2687859 | 8/1995 |

(Continued)

OTHER PUBLICATIONS

International Search Report for PCT/US2009/047003.

*Primary Examiner* — Brian Healy
(74) *Attorney, Agent, or Firm* — Timothy M. Morella

(57) ABSTRACT

A connector comprises a housing, a lever and a lock portion. The housing receives terminals. The lever, rotatably attached to the housing, is configured to be rotatable between a first position, where an initial stage of fitting to a counterpart connector is established, and a second position, where the fitting thereof is completed. The lock portion, capable of locking the lever at the second position, is slidably attached to a body portion of the lever, and configured to be slid between a lock position and a lock release position. The lever is provided with a positioning latch-portion configured to latch the lock portion. The positioning latch-portion is provided with a concave latch-portion and a convex latch-portion configured to be elastically displaced to be engaged in or disengaged from the concave latch-portion.

31 Claims, 7 Drawing Sheets

U.S. PATENT DOCUMENTS

| | | | |
|---|---|---|---|
| 6,887,092 B2 * | 5/2005 | Minota | 439/372 |
| 7,140,785 B2 * | 11/2006 | Machida et al. | 385/92 |
| 2002/0114589 A1 * | 8/2002 | Igl et al. | 385/88 |
| 2006/0177182 A1 * | 8/2006 | Mine et al. | 385/74 |
| 2011/0091163 A1 * | 4/2011 | Shimotsu et al. | 385/76 |
| 2012/0121223 A1 * | 5/2012 | Tamura et al. | 385/92 |

FOREIGN PATENT DOCUMENTS

| | | |
|---|---|---|
| JP | 1997-248494 | 3/1999 |
| JP | 2001-043934 | 2/2001 |
| JP | 3331409 | 2/2001 |
| JP | 3741911 | 4/2001 |
| JP | 2003-423213 | 7/2005 |
| JP | 2004-352408 | 6/2006 |
| JP | 2006-162834 | 6/2006 |
| JP | 4483577 | 7/2006 |
| JP | 4730274 | 4/2008 |
| WO | PCT/US2001/046817 | 5/2002 |
| WO | WO 02/41053 A2 | 5/2002 |
| WO | PCT/JP2007/052797 | 8/2007 |
| WO | PCT/JP2007/063152 | 2/2008 |

* cited by examiner

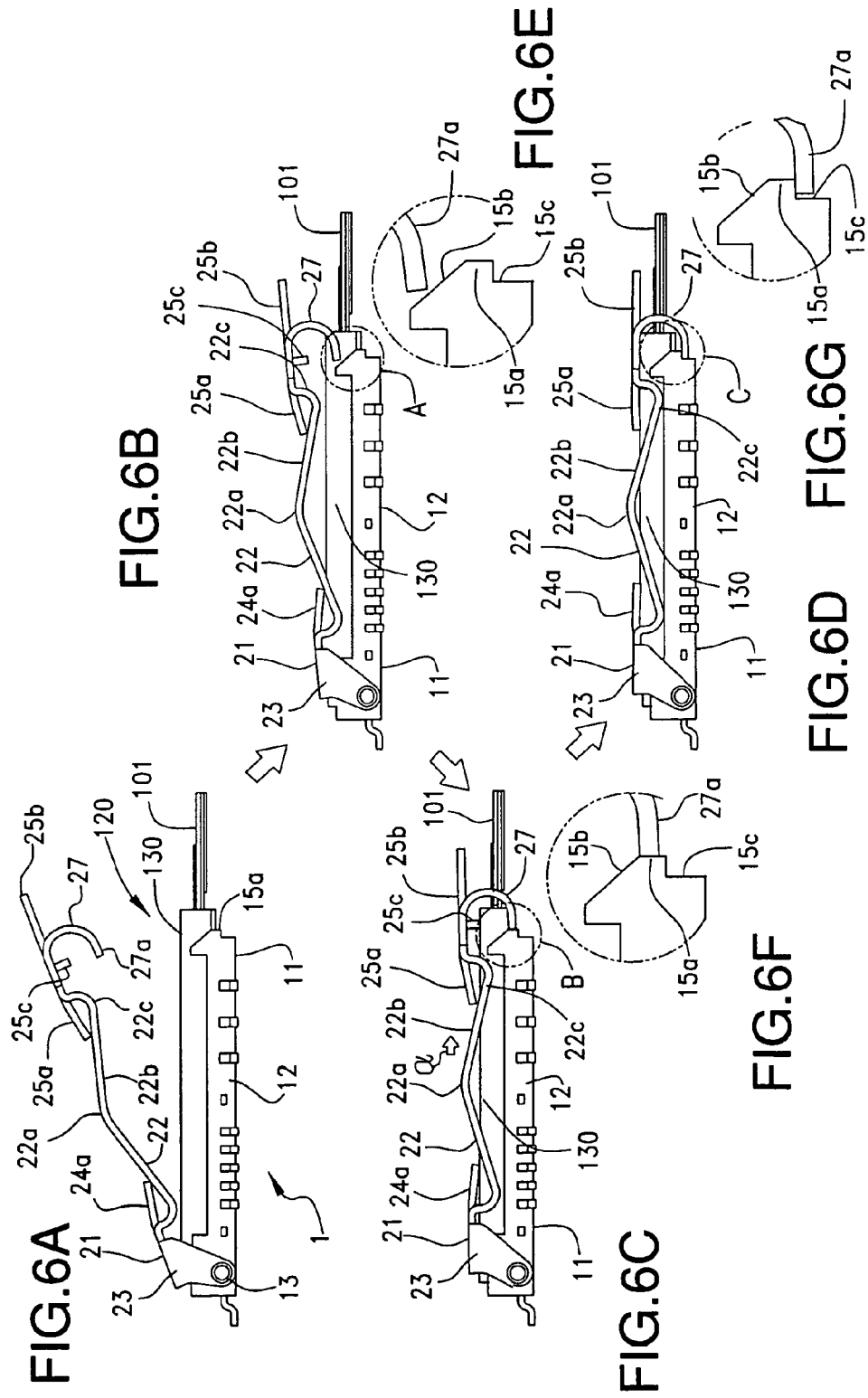

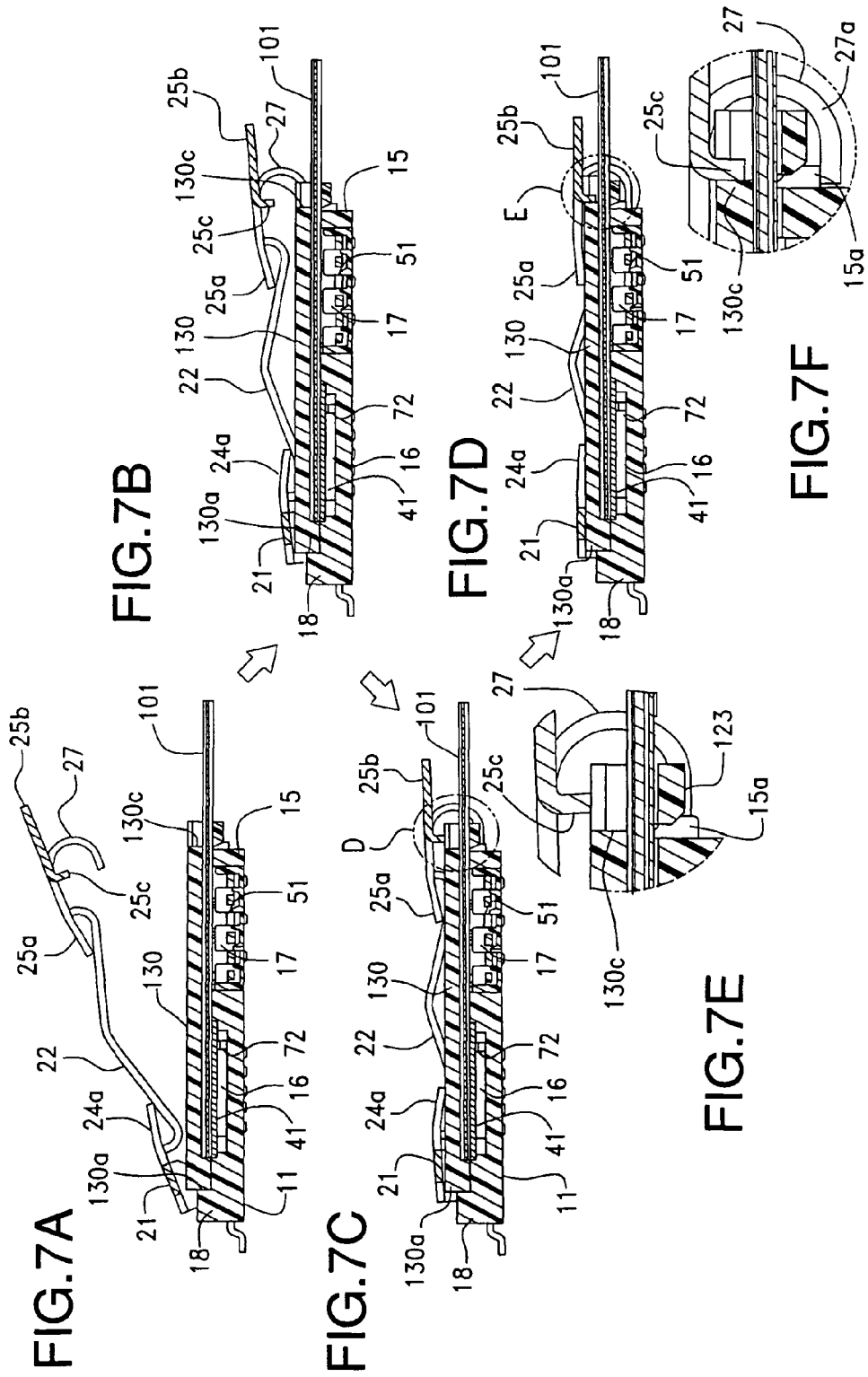

OPTICAL CONNECTOR

BACKGROUND OF THE INVENTION

1. Field of the Invention

The Present Invention relates, generally, to an optical connector, and, more particularly, to an optical connector having an increased degree of freedom in the connecting operation.

2. Description of the Related Art

In an electronic device or apparatus, such as a personal computer, a cellular phone, a personal digital assistant (PDA), a digital camera, a video camera, a music player, a game machine or a car navigation device, in order to realize both a decrease in the overall size of a casing and an increase in the size of a display screen, the casing is typically configured to be collapsible. In such a case, a flexible printed circuit and conductive wires are arranged so as to pass through an inside of a hinge portion that allows one casing to be pivotably connected with the other casing so that signals can be transmitted through parallel transmission.

Although the signal transmission speed may be increased in response to an increase in image resolution, since there is a limit in increasing the inside dimension of the hinge portion, it is practically impossible to arrange a conductive wire having a large width or diameter. In addition, when a countermeasure against electro magnetic interference (EMI) is taken, the conductive wire will become larger in the width or diameter thereof.

In this regard, a method of optical transmission capable of transmitting a large amount of signals through serial transmission and is an excellent EMI countermeasure, such as that described in Japanese Patent Application No. 11-84174, is referenced in FIG. 9. As illustrated in FIG. 9, optical element portion 870 is configured to receive an optical module, including a light emitting element and a light receiving element, and coupled to connector housing 811 by means of coupling member 841. Connector housing 811 is provided with groove-shaped guide portion 814, configured to allow a non-illustrated plug connected to a front end of a non-illustrated optical fiber to be inserted therein, and engagement wall portion 818, configured to be engaged with a front end of the plug. In addition, guide projections 831, formed on a wall surface of engagement wall portion 818, are engaged with a pair of engagement holes formed in the plug, so that the plug is placed in position after insertion thereof.

The optical connector is provided with clamping member 821, rotatably attached to the connector housing 811. A front end of clamping member 821 is rotatably mounted on rotation shaft 813, configured to project from a side surface of engagement wall portion 818. Clamping member 821 is provided with elongated plate-like arm parts 822, configured to extend rearward from the front end of clamping member 821. Moreover, latching portions 827 are connected to rear ends of arm parts 822 so as to be engaged with the rear end of the plug, and operation portion 825 is connected to the rear ends of latching portions 827.

When the plug is connected to the optical connector, the clamping member 821 is rotated from an attitude shown in the drawing figure of FIG. 9 to raise the operation portion 825, so that an upper surface of the guide portion 814 is open. Subsequently, the plug is inserted into the guide portion 814 from a rear side thereof, so that a front end surface of the plug comes into tight contact with the wall surface of engagement wall portion 818. In this case, the positioning of the plug is carried out by tightly fitting the guide projections 831 to be engaged with the engagement holes of the plug. Finally, when the clamping member 821 is rotated to lower the operation portion 825, the optical connector returns to assume the attitude shown in the drawing figure of FIG. 9. Owing to this configuration, the latching portions 827 are engaged with the rear end of the plug, and the plug is locked in a state of being connected to the optical connector.

However, according to the conventional optical connector, since the positioning of the plug is carried out by tightly fitting the guide projections 831 to be engaged with the engagement holes of the plug, it may be difficult for an operator to perform a connecting operation. Usually, when a plug connected to an optical fiber is connected to an optical connector, the guide projections 831 and the engagement holes are designed to have an extremely small dimensional tolerance since the positioning of a plug-side optical path relative to an optical connector-side optical path requires an extremely high degree of precision. For this reason, an operation of an operator moving the plug to cause the guide projections 831 to be inserted into the engagement holes requires a high degree of accuracy and is thus difficult to perform.

Moreover, when an unnecessarily large force is applied to the guide portion, the guide projections 831 might be broken. In recent years, with the advance in the miniaturization of the optical connector, the guide projections 831 have become miniaturized. For this reason, when an operator changes the attitude or the direction of the plug with the operator, for example, when the guide projections 831 are being engaged with the engagement holes of the plug, the guide projections 831 might be broken by a force applied by the operator.

Moreover, since a direction where the plug is moved relative to the optical connector is limited to only one direction, a degree of freedom in the connecting operation is low. In addition, since the guide projections 831 are configured to extend rearward, it is necessary to insert the plug into the guide portion 814 from a rear side thereof in order to cause the guide projections 831 to be engaged with the engagement holes of the plug. For this reason, for example, in a case where other components such as an electronic component, e.g., an IC, are mounted on the rear side of the optical connector mounted in a small electronic device, for example, it might be extremely difficult for an operator to insert the plug into the guide portion 814 from the rear side.

SUMMARY OF THE INVENTION

Therefore, it is an object of the present invention to obviate the above-described problems encountered by the conventional optical connector and to provide an optical connector having such a configuration that a concave portion having oblique side portion is formed in either one of a front end portion of a plug connected to an optical waveguide and a rear end portion of an abutting portion of a connector housing, the connector housing being provided to be engaged with the front end portion of the plug, and that a convex portion having a circular arc-shaped end portion is formed in the other one of the front end portion and the rear end portion, so that the front end portion of the plug and the rear end portion of the connector housing make multi-point contact with each other, so that the optical connector has high durability and good operability in operation while enabling it to be manufactured at a low cost, in a small size, and with a simple structure. As a result, it is possible to perform positioning of the plug relative to the connector housing in an easy and accurate manner.

Therefore, an optical connector according to the present invention comprises a connector housing configured to mount thereon a plug having a cable connected thereto, the cable having formed therein an optical waveguide, wherein: the connector housing is provided with an abutting portion having a rear end portion configured to be engaged with a front end portion of the plug; either one of the front end portion and the rear end portion has, formed therein, a convex portion having a circular arc-shaped end portion; and the other one of the front end portion and the rear end portion has, formed therein, a concave portion having two oblique side portions, which are inclined in mutually opposite directions, the circular arc-shaped end portion and the oblique side portions coming into a point contact with each other at two or more contact points when the front end portion is engaged with the rear end portion.

In the optical connector according to another embodiment of the present invention, the front end portion and the rear end portion have, formed therein, a flat portion, respectively, and the flat portion of the front end portion being able to come into point contact with the flat portion of the rear end portion at one or more contact point or points.

In the optical connector according to a further embodiment of the present invention, the convex portion has a circular or sector-like shape, and the concave portion has a triangular or trapezoidal shape or a generally V-letter shape capable of allowing at least a portion of the convex portion to be inserted therein.

In the optical connector according to a still further embodiment of the present invention, the front end portion is suitable for coming into engagement with the rear end portion by being pressed toward the rear end portion.

In the optical connector according to a still further embodiment of the present invention, a lock member is attached to the connector housing to be changeable in an attitude thereof and is configured to be capable of locking the plug. The lock member includes a bent portion and is provided with an extendable/contractible portion configured to extend or contract in response to a change in an extent of bending of the bent portion, a latched portion configured to be engaged with or disengaged from the connector housing by the extension/contraction of the extendable/contractible portion, and a pressing portion configured to be capable of pressing the plug toward the rear end portion in response to the contraction of the extendable/contractible portion.

In the optical connector according to a still further embodiment of the present invention, the plug is mounted on the connector housing so that a lower surface thereof opposes an upper surface of the connector housing, and the lock member is provided with a plug pressing portion configured to be capable of pressing an upper surface of the plug toward an upper surface of the connector housing.

In the optical connector according to a still further embodiment of the present invention, the cable comprises a hybrid cable having laminated therein the optical waveguide and conductive wires, and the plug is provided with a plug-side optical connection portion and a plug-side electric connection portion. Moreover, the connector housing is provided with an optical connection portion and an electric connection portion. Thus, when the plug is mounted on the connector housing, the plug-side optical connection portion and the plug-side electric connection portion oppose the optical connection portion and the electric connection portion, respectively.

In accordance with the optical connector of the present invention, the concave portion having oblique side portion is formed in either one of the front end portion of the plug connected to the optical waveguide and the rear end portion of the abutting portion of the connector housing, the connector housing being configured to be engaged with the front end portion of the plug, and the convex portion having the circular arc-shaped end portion is formed in the other one of the front end portion and the rear end portion, so that the front end portion and the rear end portion may be in multi-point contact with each other. Owing to this configuration, it is possible to perform positioning of the plug relative to the connector housing in an easy and accurate manner. Moreover, it is possible to realize both easy unlocking properties and reliable locking properties. Accordingly, it is possible to provide an optical connector which has high durability and good operability in operation and can be manufactured at a low cost to have a simple structure.

BRIEF DESCRIPTION OF THE FIGURES

The organization and manner of the structure and operation of the Present Invention, together with further objects and advantages thereof, may best be understood by reference to the following Detailed Description, taken in connection with the accompanying Figures, wherein like reference numerals identify like elements, and in which:

FIGS. 4A to 4F are enlarged plan views illustrating an engagement state of a front end portion of a plug housing and a rear end portion of an abutting portion of a connector housing according to the embodiment of the present invention, in which FIGS. 4A to 4D illustrate the plug and the connector housing contacted with each other at different contact points, FIG. 4E illustrates the concave portion, and FIG. 4F illustrates an example where only one concave portion and only one convex portion are provided;

FIGS. 6A to 6G are side views illustrating an operation of tightly fitting the plug to be engaged with the receptacle connector according to the embodiment of the present invention, in which FIGS. 6A to 6D are views illustrating a series of operations thereof, FIG. 6E is an enlarged view of the "A" part in FIG. 6B, FIG. 6F is an enlarged view of the "B" part in FIG. 6C, and FIG. 6G is an enlarged view of the "C" part in FIG. 6D;

FIGS. 7A to 7F are sectional views illustrating an operation of tightly fitting the plug to be engaged with the receptacle connector according to the embodiment of the present invention, in which FIGS. 7A to 7D are views illustrating a series of operations thereof, FIG. 7E is an enlarged view of the "D" part in FIG. 7C, and FIG. 7F is an enlarged view of the "E" part in FIG. 7D;

FIGS. 8A to 8C are side views illustrating an operation of releasing a lock state of the plug according to the embodiment of the present invention, in which FIGS. 8A to 8C are views illustrating a series of operations thereof.

DESCRIPTION OF THE PREFERRED EMBODIMENTS

While the Present Invention may be susceptible to embodiment in different forms, there is shown in the Figures, and will be described herein in detail, specific embodiments, with the understanding that the discussion herein is to be considered an exemplification of the principles of the Present Invention, and is not intended to limit the Present Invention merely to that as illustrated. Further, in the embodiments illustrated in the Figures, representations of directions such as up, down, left, right, front, rear and the like, used for explaining the structure and movement of the various elements of the Present Invention, are not absolute, but relative. These representations are appropriate when the elements are in the position shown in the Figures. If the description of the position of the elements changes, however, it is assumed that these representations are to be changed accordingly.

Figure 1:
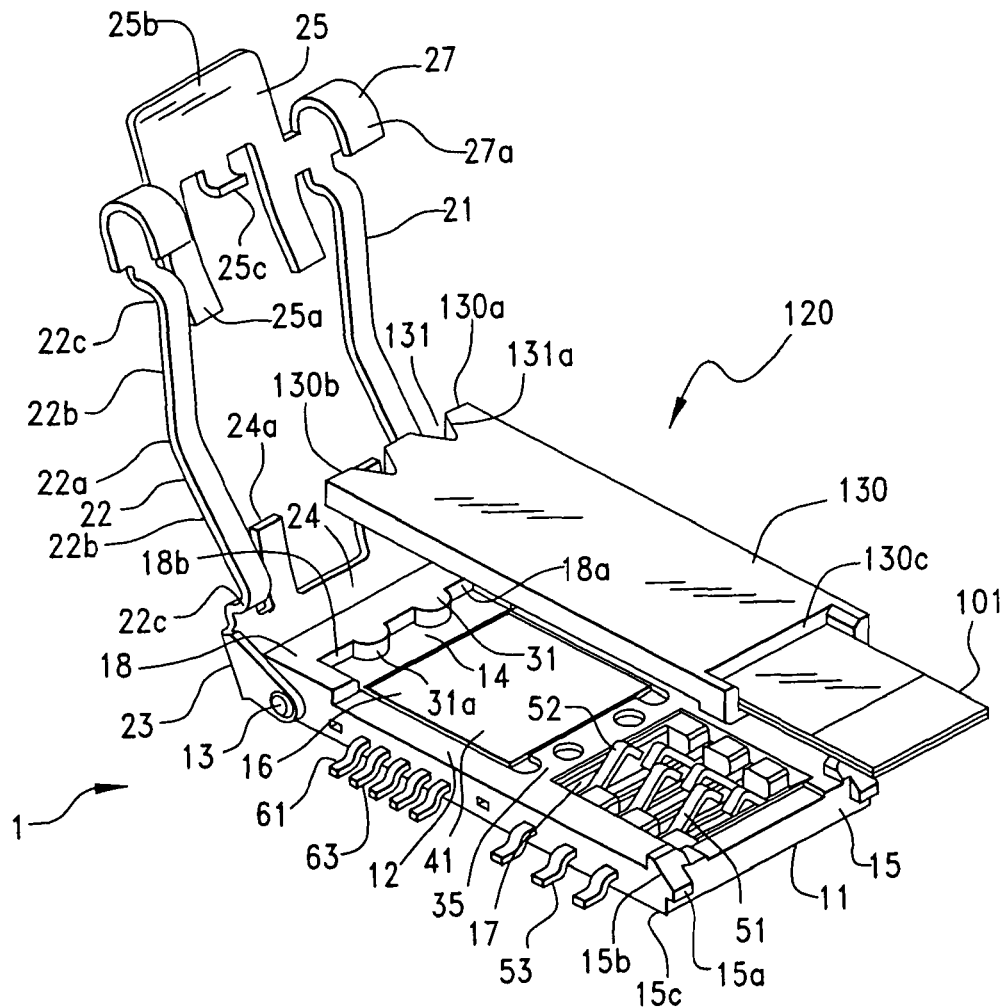
FIG. 1 is a perspective view of a hybrid connector according to an embodiment of the present invention, illustrating a state where a lock member is left open and a hybrid cable is maintained at its position prior to being connected.
Figure 2:
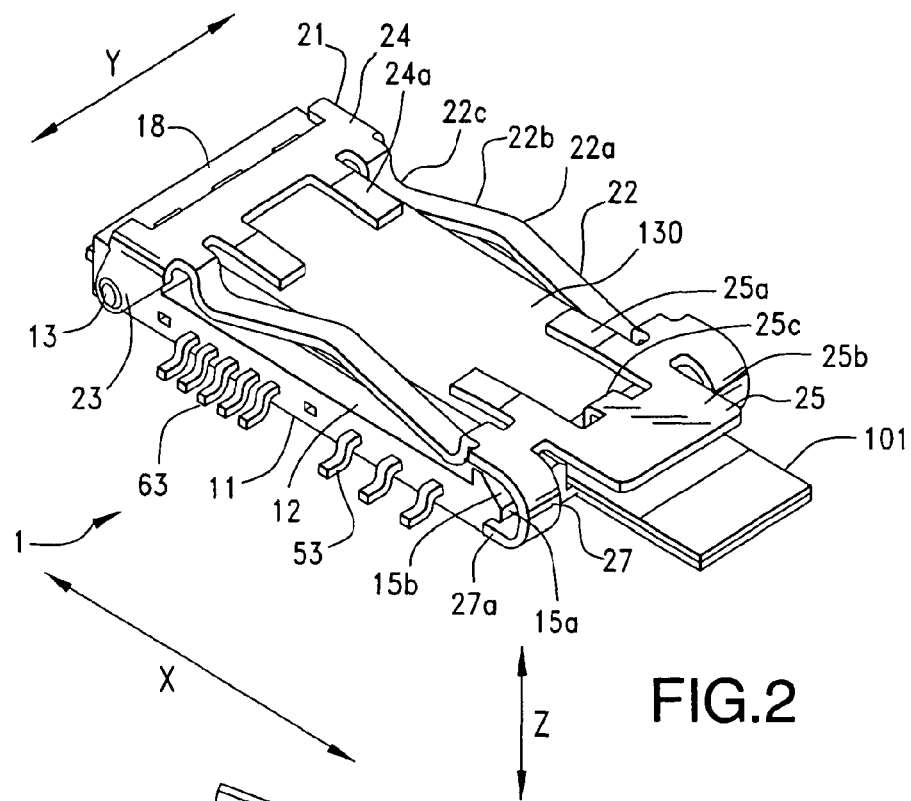
FIG. 2 is a perspective view of the hybrid connector of FIG. 1, illustrating a state where the lock member is closed and the hybrid cable has been connected.

Referring to FIGS. 1-2, a receptacle connector as a optical connector according to the present embodiment, generally designated by reference numeral 1, is mounted on a surface of a board such as a non-illustrated circuit board and functions as a hybrid connector for connecting a hybrid cable 101 as a cable.

In this specification, the hybrid cable 101 is a combined cable having integrated therewith an optical waveguide and later-described conductive wires 151. Specifically, the hybrid cable 101 is one in which a flexible flat plate-like cable such as a flexible printed circuit is laminated, by bonding, onto one surface of a strip-like optical waveguide to form an integrated body, or one in which a conductive pattern is formed on one surface of a strip-like optical waveguide.

In addition, a plug housing 130 is attached to an end portion of the hybrid cable 101, and a plug 120 as a plug connector being a counterpart hybrid connector is formed in the end portion. Moreover, the hybrid cable 101 is connected to the receptacle connector 1 by tightly fitting the plug 120 to be engaged with the receptacle connector 1.

Moreover, the optical connector according to the present invention functions as a connector for connecting thereto an optical waveguide. Therefore, it is to be noted that the optical connector does not need to be a hybrid cable for connecting thereto a combined cable having integrated therewith an optical waveguide and conductive wires 151 as long as it is capable of connecting cables having an optical waveguide. However, in the present embodiment, for the sake of explanation, the optical connector will be described as being comprised of a hybrid connector capable of connecting thereto a hybrid cable 101 as a combined cable having integrated therewith an optical waveguide and the conductive wires 151.

Although the purpose of use of the hybrid cable 101 is not particularly limited, it is suitably used, for example, in a personal computer, a cellular phone, a PDA, a digital camera, a video camera, a music player, a game machine, or a car navigation device. Specifically, it is particularly useful in an electronic device or apparatus in which a casing is divided into a plurality of parts, and neighboring ones of the division parts are rotatably connected with each other, so that the hybrid cable is wired so as to pass through an inside of a hinge portion that rotatably connects the neighboring division parts. Moreover, the hybrid cable 101 is capable of transmitting signals through serial transmission via the optical waveguide and is an excellent EMI countermeasure, and is thus suitably used for high-speed transmission of a large amount of signals. Furthermore, the receptacle connector 1 is suitably used for being mounted on a surface of a board arranged within a casing of the electronic device or apparatus.

In addition, in the present embodiment, representations of directions such as up, down, left, right, front, rear, and the like, used for explaining the structure and movement of the receptacle connector 1, the hybrid cable 101, the plug 120, and each part of other components are not absolute, but relative. These representations are appropriate when the receptacle connector 1, the hybrid connector 101, the plug 120, and each part of other components are in the position shown in the drawing figures. If the position of the receptacle connector 1, the hybrid connector 101, the plug 120, or each part of other components changes, however, it is assumed that these representations are to be changed according to a change in the position of the receptacle connector 1, the hybrid connector 101, the plug 120, or each part of other components.

The receptacle connector 1 is provided with a connector housing 11 that is integrally formed of an insulating material such as synthetic resin and a lock member 21 as an elastic lock member, that is integrally formed of an elastically deformable material such metal or synthetic resin and is attached to the connector housing 11 in an attitude-changeable state. The lock member 21 may be formed by applying processing, e.g., bending and pressing, to a metal plate. Moreover, the lock member 21 is capable of changing its attitude by having a proximal end thereof (the lower end in FIG. 1) being rotatably connected to a distal end (the left end in FIG. 1) of the connector housing 11, so that it is rotated between an open position as a first position, as illustrated in FIG. 1, for mounting the plug 120 onto the connector housing 11 and a closed position as a second position, as illustrated in FIG. 2, for locking the plug 120.

The lock member 21 is an approximately rectangular, hollow plate-like member and includes a first crossbar portion 24 and a second crossbar portion 25 configured to extend in a short-axis direction (width direction) and a pair of elongated strip plate-like flexible portions 22, configured to extend in a long-axis direction (vertical direction) so that both ends of the first crossbar portion 24 and the second crossbar portion 25 are connected with each other. The flexible portions 22 function as an extendable/contractible portion.

The first crossbar portion 24 is disposed at a distal end of the lock member 21, and proximal ends of a pair of mounting leg parts 23 as an attachment portion are connected to both ends thereof in the short-axis direction. Each of the mounting leg part 23 extends in a direction approximately perpendicular to the first crossbar portion 24 so that a distal end thereof is rotatably connected to a distal end of the connector housing 11 via a rotation shaft 13 of the connector housing 11. In other words, the mounting leg parts 23 can be said to be connected to one ends of the flexible portions 22 via the first crossbar portion 24. Furthermore, proximal ends of first pressing portions 24a as a plug pressing portion configured to extend toward the second crossbar portion 25 are connected between portions of the first crossbar portion 24 connected to the pair of flexible portions 22. In the example illustrated in the drawing figures, although two first pressing portions 24a are provided and configured as an elongated strip plate-like member, it may be configured as a broad plate-like member and one pressing portion or three or more pressing portions may be provided.

The second crossbar portion 25 is disposed at a rear end of the lock member 21, and proximal ends of a pair of latching arm parts 27 as a latched portion are connected to both ends on the rear end side in the long-axis direction. As illustrated in FIG. 1, each of the latching arm parts 27 has a generally U shape in side view and extends in a direction away from the first crossbar portion 24 to be downwardly bent so that a distal end portion thereof 27a is directed toward the first crossbar portion 24 to be engaged with or disengaged from the connector housing 11. In other words, the latching arm parts 27 can be said to be connected to one ends of the flexible portions 22 via the second crossbar portion 25. Moreover, at the closed position as illustrated in FIG. 2, the distal end portions 27a are latched to lock projections 15a as a latching portion of the connector housing 11. Furthermore, proximal ends of second pressing portions 25a as a plug pressing portion configured to extend toward the first crossbar portion 24 are connected between portions of the second crossbar portion 25 connected to the pair of flexible portions 22. In the example illustrated in the drawing figures, although two second pressing portions 25a are provided and configured as an elongated strip plate-like member, it may be configured as a broad plate-like member and one pressing portion or three or more pressing portions may be provided.

In addition, a proximal end of a plate-like operation portion 25b extending in a direction away from the first crossbar portion 24 is connected to a portion of the second crossbar portion 25 disposed inner than the portions thereof connected to the latching arm parts 27. Although the operation portion 25b is a portion operated by an operator when an attitude of the lock member 21 is to be changed, the operation portion 25b may be appropriately omitted if not necessary.

In addition, proximal end of a plate-like pressing portion 25c configured to extend toward the lower side is connected to the portion between the two second pressing portions 25a of the second crossbar portions 25. The pressing portion 25c is a member contacts with the pressed portion 130c of the plug housing 130, and presses the plug 120 toward the tip of the connector housing 11. In the example illustrated in the drawing figures, although one pressing portion 25c is provided and configured as a member with narrow width, it may be configured as a member with broad width and two or more pressing portions may be provided.

Figure 3:
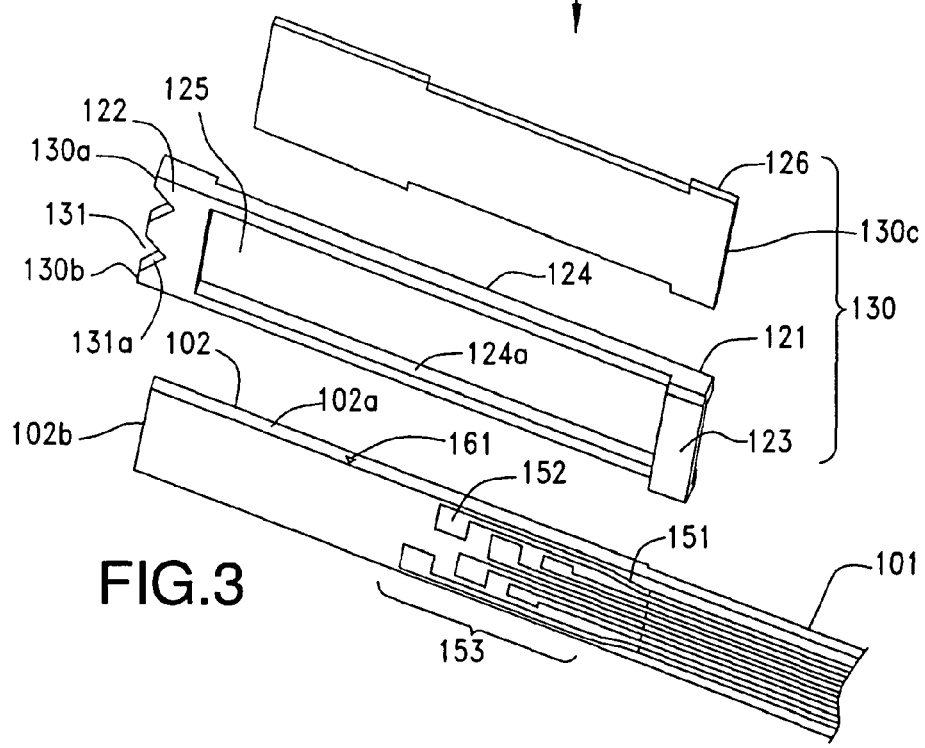
FIG. 3 is an exploded perspective view of a plug according to the embodiment of the present invention.

Moreover, each of the flexible portions 22 has a generally dog-leg shape in side view as illustrated in FIG. 2 and is provided with a bent portion 22a that is bent so as to upwardly project at the closed position as illustrated in FIG. 3, flat plate-like or straight-line shaped straight portions 22b connected to both sides of the bent portion 22a, and connection portions 22c connecting both ends of the bent portion 22 to the first crossbar portion 24 and the second crossbar portion 25. Since the flexible portions 22 have such a lateral shape and are formed of an elastic material, they are capable of being elastically expanded or contracted. That is, since a distance between both ends of the flexible portion 22 can be increased, it is possible to increase a distance between the first crossbar portion 24 and the second crossbar portion 25. Specifically, when the bent portion 22a is downwardly pressed at the closed position, the degree of bending of the bent portion 22a is decreased and thus an angle between the straight portions 22b at both sides thereof is increased, and as a result, the distance between both ends of the flexible portion 22 is increased. That is, the flexible portion 22 is expanded or contracted in accordance with a change in the degree of bending of the bent portion 22a.

In the example illustrated in the drawing figures, the connection portions 22c are curved so as to downwardly project at the closed position. Owing to this configuration, it is possible to decrease a height dimension of the receptacle connector 1 without needing to change the degree of bending of the bent portion 22a, and thus, the height of the receptacle connector 1 at the closed position can be reduced. Moreover, the connection portions 22c are not necessarily curved so as to downwardly project but may be curved so as to upwardly project. However, when it is not necessary to reduce the height, the connection portions 22c may not be formed in a curved shape but in a flat shape: in such a case, the height dimension of the receptacle connector 1 at the closed position is increased by the amount of the height dimension at the curved portions of the connection portions 22c. Moreover, the bent portion 22a may be bent so as to upwardly project at the closed position. In the example illustrated in the drawing figures, although the bent portion 22a is disposed at an approximately center between the first crossbar portion 24 and the second crossbar portion 25, the bent portion 22a may be disposed at a position close to the first crossbar portion 24 or a position close to the second crossbar portion 25. Moreover, two or more bent portions 22a may be provided. That is, it is not necessary to provide the straight portions 22b, and an extending/contracting function may be provided to the flexible portion 22 as long as at least one bent portion 22a is provided to the flexible portion 22.

Owing to such a configuration as described above, the lock member 21 is capable of locking the plug 120 by pressing the plug 120 against the connector housing 11 from upper and rear sides thereof at the closed position as illustrated in FIG. 2 in a state where the plug 120 is accurately positioned relative to the connector housing 11. Moreover, when an operator downwardly presses the bent portion 22a by the operator, the whole body of the lock member 21 is extended in the long-axis direction so that the latched state of the distal end portion 27a of the latching arm part 27 is released. Therefore, it is easy to release the lock state of the plug 120.

The connector housing 11 is a plate-like member having a generally rectangular shape in top plan view and is provided with a pair of side wall portions 12 extending in the long-axis direction and a rear-end wall portion 15 extending in the width direction at a rear end thereof so as to connect the side wall portions 12 at both sides thereof. The connector housing 11 is further provided with a guide portion 14, an optical connection portion 16, and an electric connection portion 17 being arranged in tandem in the long-axis direction from a distal end thereof toward the rear end. The rotation shaft 13 is attached in the vicinity of a distal end of the side wall portions 12, and the mounting leg parts 23 of the lock member 21 are rotatably attached to the rotation shaft 13.

The opposite side wall portions 12 are connected with each other, at the distal end thereof, by the guide portion 14 while they are connected with each other, at a middle thereof, by a partition wall portion 35 extending in the width direction so as to partition the optical connection portion 16 and the electric connection portion 17.

Moreover, in the vicinity of both ends in the width direction of the rear-end wall portion 15, that is, in rear end surfaces of the opposite side wall portions 12, lock projections 15a as a latching portion are formed. When the lock member 21 is position at the closed position, the distal end portions 27a of the latching arm parts 27 are engaged with the lock projections 15a so that the lock member 21 is latched to the connector housing 11. As a result, the plug 120 is locked. Moreover, since the upper surfaces of the lock projections 15a are configured as tapered surfaces 15b that are downwardly sloped toward a rear side so that the distal end portions 27a can be easily slid on the upper surfaces. Furthermore, concave portions on the lower surface sides of the lock projections 15a are configured as concave latching portions 15c so that the distal end portions 27a can be firmly latched. The lock projections 15a may be formed on side surfaces of the opposite side wall portions 12.

The guide portion 14 is provided with a flat upper surface as a guide surface and an abutting portion 18 as a positioning portion configured to upwardly project from the upper surface. The abutting portion 18 is a wall-like portion extending in the width direction and integrally formed at a front end of the guide portion 14. A rear end portion 18a as a positioning end of the abutting portion 18 opposes a front end portion 130a of the plug 120, that is, the front end portion 130a of the plug housing 130.

Moreover, a convex portion 31 having a sector-like shape and rearwardly projecting from the rear end portion 18a is formed in the abutting portion 18. In the example illustrated in the drawing figures, although the convex portion 31 has a sector-like shape having a center angle of about 180 degrees, i.e., an approximately semicircular shape, the shape of the convex portion 31 is not particularly limited. That is, as long as the convex portion 31 has a circular arc-shaped end portion 31a having an approximately circular arc shape and at least portions of flat portions 18b being present at both sides thereof, it does not need to have a semicircular or sector-like shape but may have an arbitrary shape. Moreover, in the example illustrated in the drawing figures, although the flat portions 18b are straight-line shape, it does not need to be a straight line in a strict sense of meaning but it may be a smooth curve. Furthermore, in the example illustrated in the drawing figures, although two convex portions 31 are provided, the number of convex portions may be one or three or more.

On the other hand, a concave portion 131 configured to be engaged with the convex portion 31 is formed in the front end portion 130a of the plug housing 130 of the plug 120. In the example illustrated in the drawing figures, although the concave portion 131 is opened to the front end portion 130a and has a triangular shape or a generally V shape having two oblique side portions 131a, which are inclined in mutually opposite directions with respect to a straight line parallel to the long-axis direction of the plug 120, the shape of the concave portion 131 is not particularly limited. That is, as long as the concave portion 131 is opened to the front end portion 130a and has at least portions the flat portions 130b being present at both sides thereof and two oblique side portions 131a which are inclined in mutually opposite directions with respect to a straight line parallel to the long-axis direction of the plug 120, thus allowing at least a portion of the convex portion 31 to be inserted therein, it does not need to have a triangular shape or a generally V shape, but may have a trapezoidal shape, for example, and have an arbitrary shape. In the example illustrated in the drawing figures, although two concave portions 131 are provided, the number of concave portions 131 may be one or three or more. Moreover, the number of concave portion 131 does not need to correspond to the number of convex portions 31. For example, the number of concave portions 131 may be smaller than the number of convex portions 31 in a configuration that two or more convex portions 31 are inserted in one concave portion 131.

When the convex portion 31 of the abutting portion 18 is engaged with the concave portion 131 of the plug housing 130, the plug 120 mounted on the connector housing 11 can be guided to a predetermined position with high accuracy. Hence, the positioning of the plug 120 relative to the receptacle connector 1 is carried out with high accuracy. Moreover, the plug 120 is a thin plate-like member having an approximately rectangular shape in plan view, and when the plug 120 is mounted on the connector housing 11, a lower surface thereof opposes an upper surface of the connector housing 11.

In addition, the optical connection portion 16 is a portion that performs transferring of light to the optical waveguide of the hybrid cable 101 and is configured as a concave portion capable of receiving therein an optical device such as a control IC 71 or the like as a light receiving/emitting control device (not shown) provided with a later-described optical semiconductor device 72, e.g., a light receiving element and a light emitting element, and a control circuit for controlling the optical semiconductor device 72. In the example illustrated in the drawing figures, an upper surface of the concave portion is sealed by a thin plate-like sealing plate 41 formed of a translucent material such as glass.

Moreover, the optical connection portion 16 receives therein optical terminals 61 formed of a conductive material such as metal and connected to the optical semiconductor device 72 or the control IC 71. The optical terminals 61 are provided with tail portions 63 as a board connection portion connected, by soldering or the like, to connection pads formed on a surface of a board so that the tail portions 63 are projected outward from the lateral surfaces of the connector housing 11.

Furthermore, the electric connection portion 17 is a portion that is electrically connected to the conductive wires 151 of the hybrid cable 101 and is configured as a concave portion capable of receiving therein electric connection terminals 51 formed of a conductive material such as metal. The electric connection terminals 51 are provided with contact portions 52 that are formed in the vicinity of free ends thereof and are curved so as to be convex toward the upper side and tail portions 53 as a board connection portion connected, by soldering or the like, to connection pads formed on a surface of a board, so that the tail portions 53 are projected outward from the lateral surfaces of the connector housing 11.

FIG. 3 is an exploded perspective view of a plug according to the embodiment of the present invention. Although the hybrid cable 101 is a thin plate member having an elongated strip shape, only a portion in the vicinity of a front end thereof (left end in the drawing figure) is illustrated in FIG. 3. Moreover, a connection end portion, designated by reference numeral 102, is formed within a range of a predetermined length from a front end surface thereof 102b.

On the lower surface of the hybrid cable 101, a plurality of lines, e.g., six lines of foil-like conductive wires 151 formed of a conductive material such as metal is arranged in parallel with one another at a predetermined pitch on an insulating layer of the hybrid cable 101. Moreover, another insulating film is covered on a lower side of the conductive wires 151. Furthermore, the insulating film is removed in the connection end portion 102 so that the lower surface of the conductive wires 151 is exposed.

In addition, connection pad portions 152 having a large width are formed at distal ends of the respective conductive wires 151. The respective connection pad portions 152 are formed at positions corresponding to the contact portions 52 of the electric connection terminals 51 received in the electric connection portion 17 of the connector housing 11 in a state where the hybrid cable 101 is connected to the receptacle connector 1. Moreover, a portion within the range, where the connection pad portions 152 are arranged, functions as a plug-side electric connection portion 153. Although the connection pad portions 152 may be arranged in an arbitrary form, it is preferable that they are arranged in a zigzag form, or arranged in tandem in an axial direction of the hybrid cable 101, as illustrated in the drawing figures. Owing to this configuration, it is possible to arrange a number of connection pad portions 152 without needing to increase the width of the connection end portion 102, and as a result, it is possible to suppress any increase in the width dimension of the plug 120.

Moreover, at a portion of the connection end portion 102 disposed closer the front end than the connection pad portions 152, an optical path conversion portion 161 as a plug-side optical connection portion is formed. The optical path conversion portion 161 is provided with a slope surface 162 functioning as a mirror surface and is capable of changing a direction of light transmitted from the optical waveguide to about a right angle. That is, the optical path conversion portion 161 changes an optical path extending in an axial direction of the hybrid cable 101 to an optical path extending in a direction perpendicular to the lower surface of the hybrid cable 101. Owing to this configuration, light transmitted through the optical waveguide can be emitted toward the lower side from the lower surface of the hybrid cable 101, and light incident onto the lower surface of the hybrid cable 101 from the lower side can be introduced to the optical waveguide. The optical path conversion portion 161 is formed at a position corresponding to the optical semiconductor device 72 received in the optical connection portion 16 of the connector housing 11 in a state where the hybrid cable 101 is connected to the receptacle connector 1.

The plug housing 130 includes a plug housing body 121 configured as a rectangular frame-like member extending in an axial direction of the hybrid cable 101 and a plug top plate 126 configured as a rectangular plate-like member extending in the axial direction of the hybrid cable 101. The plug housing body 121 is a member integrally formed of an insulating material such as synthetic resin and is provided with a pair of side wall portions 124 extending in the long-axis direction, a front crossbar portion 122 configured to connect front ends of the side wall portions 124 with each other, and a rear crossbar portion 123 configured to connect rear ends of the side wall portions 124 with each other. Moreover, a rectangular opening, designated by reference numeral 125, penetrating through the plug housing body 121 in a thickness direction thereof, has a perimeter thereof defined by the side wall portions 124, the front crossbar portion 122, and the rear crossbar portion 123.

The dimension in the thickness direction of the side wall portions 124 is approximately identical to a dimension in the thickness direction of the connection end portion 102 of the hybrid cable 101. Moreover, when inner side surfaces 124a of the side wall portions 124 are brought into tight contact with the side surfaces 102a of the connection end portion 102 of the hybrid cable 101, the position in the width direction of the hybrid cable 101 is determined by the side wall portions 124.

Moreover, the front crossbar portion 122 functions as a positioned portion of the plug 120 and is configured as a rectangular plate-like member having a rectangular sectional shape, being provided with a flat lower surface as a guided surface and the front end portion 130a as the positioning end. Moreover, the concave portion 131 is formed in the front end portion 130a. The front crossbar portion 122 functions as a guided portion when the plug 120 is mounted on the connector housing 11, the concave portion 131 is engaged with the convex portion 31 of the connector housing 11, while the front end portion 130a opposes the rear end portion 18a of the abutting portion 18 of the connector housing 11, and the lower surface of the front crossbar portion 122 opposes an upper surface of the guide portion 14 of the connector housing 11. Moreover, the lower surface of the front crossbar portion 122 is formed so as to be even with the lower surface of the side wall portions 124. Furthermore, the rear end surface of the front crossbar portion 122 is brought into tight contact with the front end surface 102b of the connection end portion 102 of the hybrid cable 101, so that the position in the axial direction of the hybrid cable 101 is determined. In addition, the dimension in the thickness direction of the front crossbar portion 122 is substantially identical to the sum of a dimension in the thickness direction of the side wall portions 124 and a dimension in the thickness direction of the plug top plate 126.

The rear crossbar portion 123 is a rectangular plate-like member having a rectangular sectional shape and is provided with a flat upper surface, being configured such that an upper surface thereof is brought into tight contact with the lower surface of the connection end portion 102 of the hybrid cable 101, so that the hybrid cable 101 is supported from the lower side. The rear crossbar portion 123 is connected to the side wall portions 124 so that the upper surface thereof is at the same surface as the lower surface of the side wall portions 124. Therefore, the rear end surface of the plug housing body 121 has an approximately U shape as viewed from a rear side thereof.

Moreover, the plug top plate 126 is an approximately rectangular thin plate-like member and is fixed by being attached to the plug housing body 121 so that the opening 125 is blocked from the upper side. In the example illustrated in the drawing figures, although the plug housing body 121 and the plug top plate 126 are formed to be separated from each other, the plug housing body 121 and the plug top plate 126 may be integrally formed therewith. Furthermore, it is preferable that the plug top plate 126 functions as a shielding plate. For example, it is preferably configured as one formed of a metal plate, one obtained by over-molding a metal plate with synthetic resin, one formed of a laminated composite plate containing a metal layer, or one formed of a conductive composite material in which a conductive material such as metal or carbon is mixed into a matrix of synthetic resin or the like.

In addition, the length of the plug top plate 126, that is, a dimension thereof in the long-axis direction, is substantially the same as a dimension of the plug housing body 121 as measured from the rear end surface of the front crossbar portion 122 to the front end surface of the rear crossbar portion 123. Moreover, the width of the plug top plate 126, that is, a dimension thereof in the short-axis direction, is substantially the same as a dimension of the plug housing body 121 as measured from an outer surface of one of the side wall portions 124 to an outer surface of the other of the side wall portions 124.

The rear end surface of the plug top plate 126 functions as a pressed portion 130c of the plug housing 130, so that when the lock member 21 is moved to the closed position, the pressed portion 130c is brought into tight contact with the pressing portion 25c to be pressed toward the distal end of the connector housing 11. For this reason, the entire body the plug 120 is pressed toward the distal end of the connector housing 11 by the lock member 21.

When the plug top plate 126 is fixed by being attached to the plug housing body 121 so that the front end surface of the plug top plate 126 is brought into tight contact with the rear end surface of the front crossbar portion 122, the assembly of the plug housing 130 is completed. In this case, the whole surface of the opening 125 and the upper surface of the side wall portions 124 are covered by the plug top plate 126. Moreover, when the plug housing body 121 and the plug top plate 126 are integrally formed therewith, the plug top plate 126 is originally attached to the plug housing body 121. In the assembled plug housing 130, the upper surface of the front crossbar portion 122 is at the same surface as the plug top plate 126.

Moreover, in the example illustrated in the drawing figures, although the plug housing 130 includes the plug housing body 121 and the plug top plate 126, the hybrid cable 101 may be fixedly secured to only the plug housing body 121 without employment of the plug top plate 126.

FIGS. 4A-4F illustrates an engagement state of the front end portion 130a of the plug housing 130 and the rear end portion 18a of the abutting portion 18 of the connector housing 11.

First, a description of the examples illustrated in FIGS. 4A to 4D will be provided. In the examples, two convex portions 31 are formed in the rear end portion 18a of the abutting portion 18 of the connector housing 11 and have an approximately semicircular shape. Moreover, two concave portions 131 are formed in the front end portion 130a of the plug housing 130 and have a triangular shape. Furthermore, at least a portion of each of the convex portions 31 is inserted in each of the concave portions 131 to be engaged therewith.

As described above, when the plug 120 is pressed toward the distal end of the connector housing 11 when the plug 120 is being mounted on the connector housing 11, the front end portion 130a of the plug housing 130 is engaged with the rear end portion 18a of the abutting portion 18 of the connector housing 11, so that positioning of the plug 120 relative to the connector housing 11 is achieved.

In this case, the concave portions 131 have a triangular shape or a generally V-letter shape and the convex portions 31 have a semicircular shape. Hence, even when the plug 120 and the connector housing 11 are in a positional relationship that they are slightly misaligned in the width direction of the connector housing 11, when the plug 120 is frontwardly moved relative to the connector housing 11 to cause the convex portions 31 to be inserted in the concave portions 131, the circular arc-shaped end portions 31a of the convex portions 31 are slid along the oblique side portions 131 a of the concave portions 131. In this way, the misalignment in the width direction of the connector housing 11 is automatically corrected. That is, since the convex portion 31 and the concave portion 131 capable of mutually engaging with each other have a semicircular shape and a triangular shape, respectively, even when the positioning of the plug 120 relative to the connector housing 11 is roughly carried out when the convex portion 31 is being inserted in the concave portion 131, they are automatically induced to come into engagement with each other, so that the plug 120 and the connector housing 11 are accurately positioned relative to each other.

In this way, in a state where the plug 120 is positioned relative to the connector housing 11 to be mounted thereon, and the relative positions of the plug 120 and the connector housing 11 are fixed, when the engagement state of the front end portion 130a and the rear end portion 18a is viewed in a microscopic scale, as will be understood from FIGS. 4A to 4D, the front end portion 130a and the rear end portion 18a are in a multi-point contact state where they are in mutually contact at a plurality of contact points.

Figure 4A:
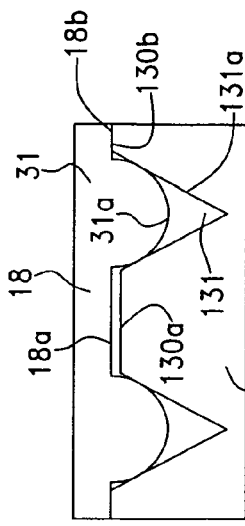

In the example illustrated in FIG. 4A, the circular arc-shaped end portion 31a of the left-side convex portion 31 is in two-point contact with the oblique side portions 131a at both sides of the left-side concave portion 131, while the circular arc-shaped end portion 31 a of the right-side convex portion 31 is in one-point contact with the left-side oblique side portion 131a of the right-side concave portion 131. That is, the front end portion 130a and the rear end portion 18a are in a three-point contact state where they are in mutual contact at three points. In this manner, since the front end portion 130a and the rear end portion 18a are in three-point contact with each other, the position and the attitude of the plug 120 relative to the connector housing 11 are stably maintained.

That is, although the plug 120 is pressed toward the distal end of the connector housing 11, and the plug housing 130 is pressed toward the abutting portion 18, since the front end portion 130a and the rear end portion 18a are in three-point contact with each other as described above, the plug housing 130 is unable to move further toward (upward in the drawing figure) the abutting portion 18. Moreover, the plug housing 130 is unable to move in the width direction (in the left-right direction in the drawing figure) of the connector housing 11 relative to the abutting portion 18. Furthermore, the plug housing 130 is unable to be tilted (rotated) with respect to the abutting portion 18. In other words, when it is assumed that the long-axis direction of the connector housing 11 is an X axis direction, the width direction thereof is a Y-axis direction, and the thickness direction thereof is a Z-axis direction, since the front end portion 130a and the rear end portion 18a are in three-point contact with each other, the plug housing 130 is made unable to move in the X-axis direction, the Y-axis direction, and unable to rotate in the Z-axis direction.

Figure 4B:
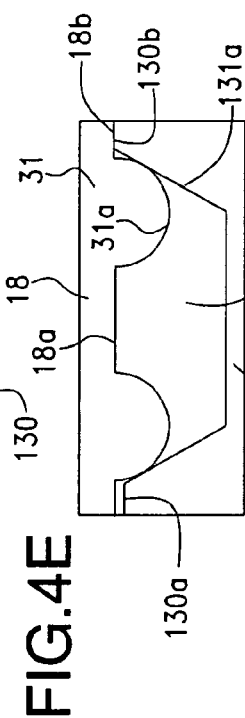

Moreover, in the example illustrated in FIG. 4B, the circular arc-shaped end portion 31a of the left-side convex portion 31 is in two-point contact with the oblique side portions 131a at both sides of the left-side concave portion 131, while the circular arc-shaped end portion 31a of the right-side convex portion 31 is in one-point contact with the right-side oblique side portion 131a of the right-side concave portion 131. That is, similar to the example illustrated in FIG. 4A, the front end portion 130a and the rear end portion 18a are in a multi-point contact state (a three-point contact state) where they are in mutual contact at three contact points. In this manner, since the front end portion 130a and the rear end portion 18a are in three-point contact with each other, the position and the attitude of the plug 120 relative to the connector housing 11 are stably maintained.

That is, similar to the example illustrated in FIG. 4A, since the front end portion 130a and the rear end portion 18a are in three-point contact with each other, the plug housing 130 is rendered unable to move in the X-axis direction, the Y-axis direction, and unable to rotate about the Z-axis direction.

Figure 4C:
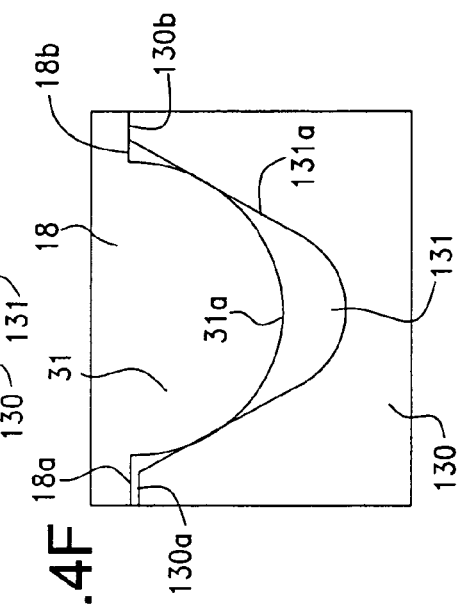

Moreover, in the example illustrated in FIG. 4C, the circular arc-shaped end portion 31a of the left-side convex portion 31 is in two-point contact with the oblique side portions 131a at both sides of the left-side concave portion 131, while the circular arc-shaped end portion 31a of the right-side convex portion 31 is not in contact with the oblique side portions 131a of the right-side concave portion 131. However, the right-side flat portion 18b of the right-side convex portion 31 is in contact with the right-side flat portion 130b of the right-side concave portion 131. In this way, the front end portion 130a and the rear end portion 18a are in a three-point contact state. In this manner, since the front end portion 130a and the rear end portion 18a are in three-point contact with each other, the position and the attitude of the plug 120 relative to the connector housing 11 are stably maintained.

That is, similar to the examples illustrated in FIGS. 4A and 4B, since the front end portion 130a and the rear end portion 18a are in three-point contact with each other, the plug housing 130 is rendered unable to move in the X-axis direction, the Y-axis direction, and unable to rotate about the Z-axis direction.

Since dimensional errors are practically inevitable when the plug 120 and the connector housing 11 are manufactured, it is practically impossible to realize perfect mutual contact between the front end portion 130a and the rear end portion 18a. Therefore, in the present embodiment, the front end portion 130a is provided with the concave portion 131 which is opened to the front end portion 130a and has at least portions the flat portions 130b being present at both sides thereof and two oblique side portions 131a which are inclined in mutually opposite directions with respect to a straight line parallel to the long-axis direction of the plug 120. The rear end portion 18a is provided with the convex portion 31 which has at least portions of flat portions 18b being present at both sides thereof and the circular arc-shaped end portion 31a having an approximately circular arc shape. Moreover, the front end portion 130a and the rear end portion 18a are in a three-point contact state where the oblique side portions 131a and/or the flat portions 130b are in three-point contact with the circular arc-shaped end portion 31a and/or the flat portions 18b. With this configuration, even when some dimensional errors are present, the plug housing 130 is rendered unable to move in the X-axis direction and the Y-axis direction and unable to rotate about the Z-axis direction relative to the connector housing 11. Therefore, the position and the attitude of the plug 120 relative to the connector housing 11 are stably maintained.

In view of the foregoing, it can be concluded that when the front end portion 130a and the rear end portion 18a are in a multi-point contact state at three or more contact points, the plug housing 130 is rendered unable to move in the X-axis direction and the Y-axis direction and unable to rotate about the Z-axis direction relative to the connector housing 11, and thus, the position and the attitude of the plug 120 relative to the connector housing 11 are stably maintained. That is, in the present embodiment, the front end portion 130a and the rear end portion 18a only need to be in a multi-point contact state where the oblique side portions 131a and/or the flat portions 130b are in three or more point contact with the circular arc-shaped end portions 31a and/or the flat portions 18b. Owing to this configuration, it is possible to stably maintain the position and the attitude of the plug 120 relative to the connector housing 11.

Moreover, by putting them into the multi-point contact state, it is possible to reduce the influence of the dimensional errors. Since the dimensional errors are set to be within an allowable range, in the case of a single-point contact, the position and the attitude of the plug 120 relative to the connector housing 11 might differ greatly from a case of the minimum dimensional error to a case of the maximum dimensional error. However, in the case of the multi-point contact, the position and the attitude of the plug 120 relative to the connector housing 11 may be determined by the average dimensional error of the contact points and is thus always determined by a normal dimensional error, and thus, the stability is improved.

For the best result, when the front end portion 130a and the rear end portion 18a are in a multi-point contact state at four or more contact points, the position and the attitude of the plug 120 relative to the connector housing 11 may be more stably maintained. That is, the front end portion 130a and the rear end portion 18a only need to be in the multi-point contact state at three or more points, from the viewpoint of stability in the position and the attitude of the plug 120 relative to the connector housing 11, it is preferable that they are in a multi-point contact state at much more points.

Figure 4D:
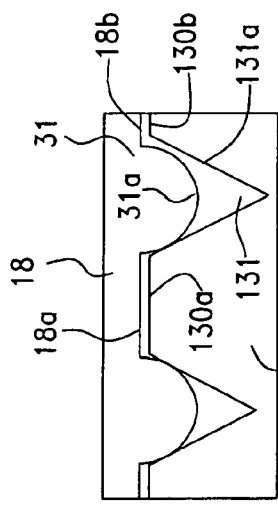

For example, in the example illustrated in FIG. 4D, the circular arc-shaped end portion 31a of the left-side convex portion 31 is in contact with the oblique side portions 131a at both sides of the left-side concave portion 131, while the circular arc-shaped end portion 31a of the right-side convex portion 31 is in two-point contact with the left-side oblique side portions 131a at both sides of the right-side concave portion 131. Moreover, the left-side flat portion 18b of the left-side convex portion 31 is in contact with the left-side flat portion 130b of the left-side concave portion 131, while the right-side flat portion 18b of the right-side convex portion 31 is in contact with the right-side flat portion 130b of the right-side concave portion 131. That is, the front end portion 130a and the rear end portion 18a are in a state where they are in mutual contact at four or more contact points. In this manner, since the front end portion 130a and the rear end portion 18a are in four or more point contact with each other, the position and the attitude of the plug 120 relative to the connector housing 11 are more stably maintained.

In addition, when the plug 120 is continuously pressed toward the distal end of the connector housing 11 for a long period of time, it may be considered a case where deformation may occur at portions of the contact points of the circular arc-shaped end portion 31a of the convex portions 31 and the oblique side portions 131a of the concave portions 131. As a result, the position and the attitude of the plug 120 relative to the connector housing 11 are changed. When the deformation of the circular arc-shaped end portion 31a and the oblique side portions 131a is taken into consideration, it is preferable that the flat portion 130b of the front end portion 130a is in contact with the flat portion 18b of the rear end portion 18a. The contact between the flat portion 130b of the front end portion 130a and the flat portion 18b of the rear end portion 18a occurs in a wider range than the contact between the circular arc-shaped end portion 31a and the oblique side portion 131a. For this reason, a pressure per unit area produced by the contact is relative small, and thus, the deformation is hard to occur in the case of the contact between the flat portion 130b of the front end portion 130a and the flat portion 18b of the rear end portion 18a. Therefore, even when the plug 120 is continuously pressed toward the distal end of the connector housing 11 for a long period of time, the position and the attitude of the plug 120 relative to the connector housing 11 can be stably maintained as long as the flat portion 130b of the front end portion 130a is in contact with the flat portion 18b of the rear end portion 18a.

Figure 4E:
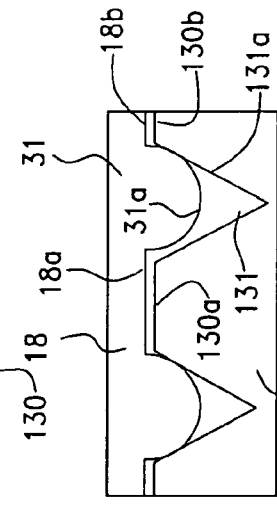

Next, a description of an example illustrated in FIG. 4E will be provided. In this example, the concave portions 131 have a trapezoidal shape rather than a triangular shape or a generally V-letter shape. Moreover, two convex portions 31 are provided, while only one concave portion 131 is provided. In addition, both of the two convex portions 31 are inserted in the same concave portion 131.

Moreover, the circular arc-shaped end portion 31a of the left-side convex portion 31 is in one-point contact with the left-side oblique side portion 131a of the concave portion 131, while the circular arc-shaped end portion 31a of the right-side convex portion 31 is in one-point contact with the right-side oblique side portion 131a of the concave portion 131. Furthermore, the right-side flat portion 18b of the right-side convex portion 31 is in contact with the right-side flat portion 130b of the concave portion 131. In this way, the front end portion 130a and the rear end portion 18a are in a three-point contact state. In this manner, since the front end portion 130a and the rear end portion 18a are in three-point contact with each other, the plug housing 130 is unable to move further toward (upward in the drawing figure) the abutting portion 18. Moreover, the plug housing 130 is unable to move in the width direction (upward in the drawing figure) of the connector housing 11 relative to the abutting portion 18. Furthermore, the plug housing 130 is unable to be tilted (rotated) with respect to the abutting portion 18. That is, since the front end portion 130a and the rear end portion 18a are in three-point contact with each other, the plug housing 130 is made unable to move in the X-axis direction, the Y-axis direction, and unable to rotate about the Z-axis direction. Therefore, the position and the attitude of the plug 120 relative to the connector housing 11 are stably maintained.

Figure 4F:
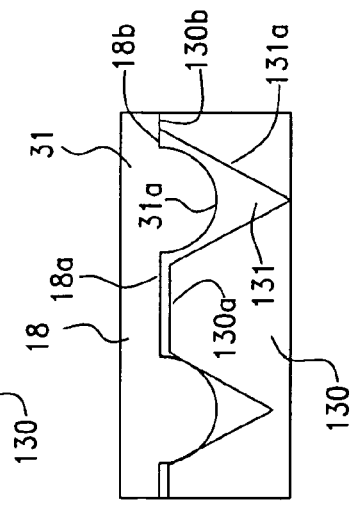

Next, a description of an example illustrated in FIG. 4F will be provided. In this example, the concave portion 131 has an approximately triangular shape or a generally V shape, though the vertex of the triangle or the valley portion of the V shape is curved. Moreover, only one convex portion 31 and only one concave portion 131 are provided.

Moreover, the circular arc-shaped end portion 31a of the convex portion 31 is in two-point contact with the oblique side portions 131a at both sides of the concave portion 131, while the right-side flat portion 18b of the convex portion 31 is in contact with the right-side flat portion 130b of the concave portion 131. In this way, the front end portion 130a and the rear end portion 18a are in a three-point contact state. In this manner, since the front end portion 130a and the rear end portion 18a are in three-point contact with each other, the plug housing 130 is unable to move further toward (upward in the drawing figure) the abutting portion 18. Moreover, the plug housing 130 is unable to move in the width direction (upward in the drawing figure) of the connector housing 11 relative to the abutting portion 18. Furthermore, the plug housing 130 is unable to be tilted (rotated) with respect to the abutting portion 18. That is, since the front end portion 130a and the rear end portion 18a are in three-point contact with each other, the plug housing 130 is made unable to move in the X-axis direction, the Y-axis direction, and unable to rotate about the Z-axis direction. Therefore, the position and the attitude of the plug 120 relative to the connector housing 11 are stably maintained.

As will be understood from the examples of FIGS. 4E and 4F, the front end portion 130a is provided with the concave portion 131 which is opened to the front end portion 130a and has at least portions the flat portions 130b being present at both sides thereof and two oblique side portions 131a which are inclined in mutually opposite directions with respect to a straight line parallel to the long-axis direction of the plug 120. The rear end portion 18a is provided with the convex portion 31 which has at least portions of flat portions 18b being present at both sides thereof and the circular arc-shaped end portion 31a having an approximately circular arc shape. Moreover, the front end portion 130a and the rear end portion 18a are in a three-point contact state where the oblique side portions 131a and/or the flat portions 130b are in three-point contact with the circular arc-shaped end portion 31a and/or the flat portions 18b. Therefore, it is to be noted that the shape and the number of the convex portions 31 and the concave portions 131 may be appropriately configured as long as the above configurational requirements are satisfied.

Figure 5:
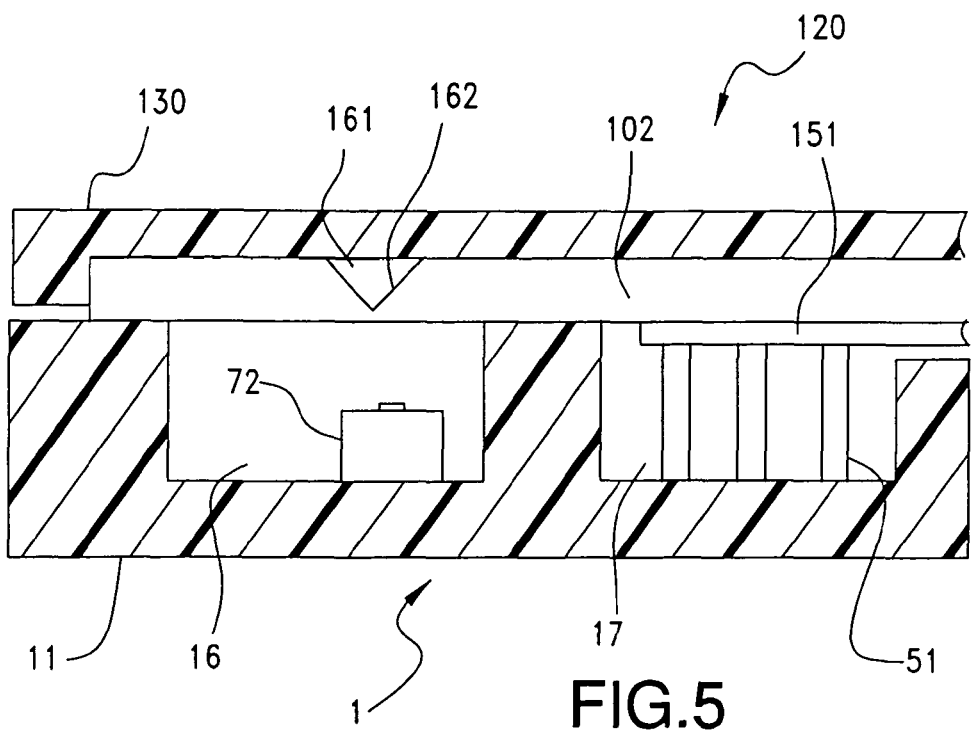
FIG. 5 is a schematic side sectional view illustrating the connection relationship between a connection end portion of the hybrid cable and an optical connection portion and an electric connection portion of a receptacle connector according to the embodiment of the present invention.
Figure 9:
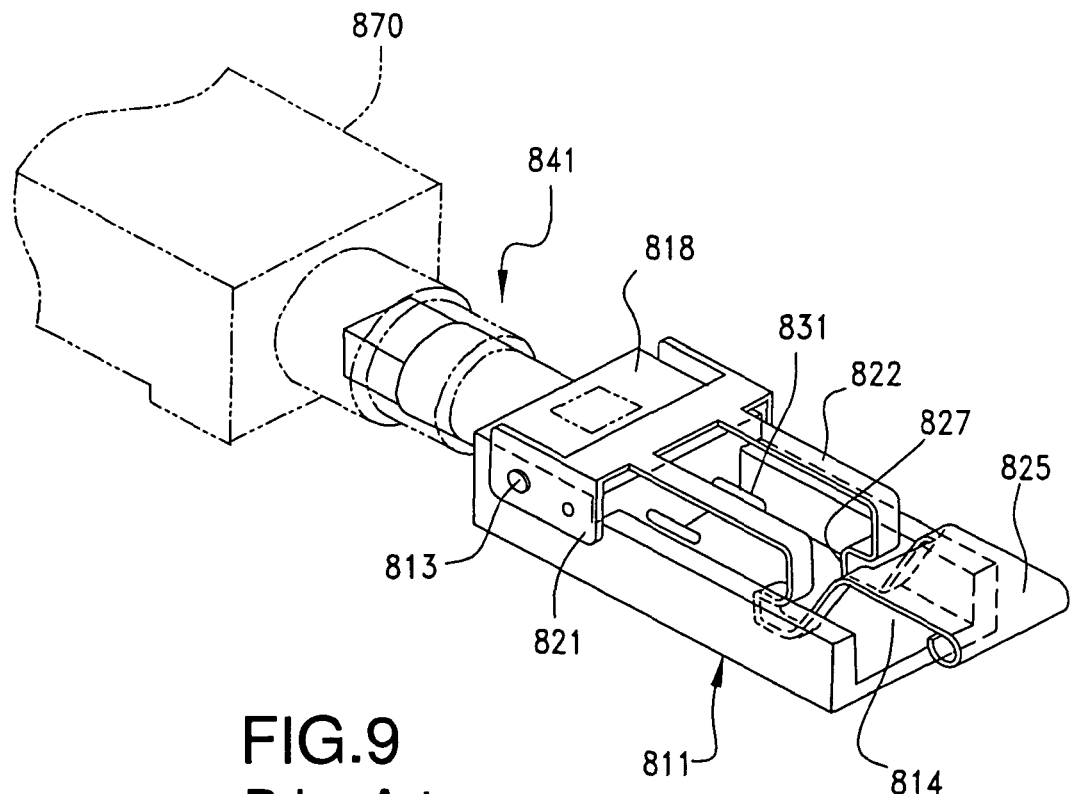
FIG. 9 is a perspective view of an optical connector according to the prior art.

With reference to FIG. 5, a description of the connection relationship between a connection end portion of the hybrid cable and an optical connection portion and an electric connection portion of a receptacle connector will be provided in detail.

Since the front end portion 130a of the plug housing 130 is engaged with the rear end portion 18a of the abutting portion 18 of the connector housing 11 in a state where the plug 120 is connected to the receptacle connector 1, the position of the plug 120 relative to the connector housing 11 is fixed with respect to the axial direction and the width direction of the hybrid cable 101. Therefore, as will be understood from FIG. 5, in a state where the plug 120 is connected to the receptacle connector 1, the optical path conversion portion 161 of the plug 120 is disposed at a position right above the optical semiconductor device 72 received in the optical connection portion 16 of the receptacle connector 1. Moreover, with respect to the width direction of the hybrid cable 101, the optical path conversion portion 161 of the plug 120 is disposed at a position right above the optical semiconductor device 72. Owing to this configuration, the hybrid cable 101 and the receptacle connector 1 are optically connected with each other.

That is, light emitted from a light emitting surface of the optical semiconductor device 72 is incident onto the hybrid cable 101 from the lower side thereof, reflected from the slope surface 162 disposed close to the rear side of the optical path conversion portion 161, introduced to the core portion corresponding to the light emitting element 72b while changing a traveling direction thereof to about a right angle, and transmitted through the core portion along the axial direction of the hybrid cable 101. On the other hand, light transmitted through the core portion along the axial direction of the hybrid cable 101 is reflected from the slope surface 162 disposed close to the rear side of the optical path conversion portion 161, emitted toward the lower side from the lower surface of the hybrid cable 101 while changing a traveling direction thereof to about a right angle, and received by a light receiving surface of the optical semiconductor device 72.

In addition, the plug-side electric connection portion 153 of the plug 120 is disposed at a position right above the electric connection portion 17 of the receptacle connector 1, and the respective connection pad portions 152 are brought into electrical contact with the contact portions 52 of corresponding ones of the electric connection terminals 51 received in the electric connection portion 17.

FIGS. 6-7 illustrate a description of the connection of the hybrid cable 101 to the receptacle connector 1 by tightly fitting the plug 120 to be engaged with the receptacle connector 1. First, as illustrated in FIG. 1, the lock member 21 of the receptacle connector 1 is moved to the open position so that the plug 120 is positioned above the connector housing 11. In this case, the lower surface of the plug 120, that is, the exposed surface of the connection pad portions 152 is positioned so as to oppose the upper surface of the connector housing 11. At the same time, the front crossbar portion 122 of the plug 120 is positioned right above the guide portion 14 of the connector housing 11, and the rear crossbar portion 123 of the plug 120 is positioned at a rear upper side of the rear-end wall portion 15 of the connector housing 11.

Subsequently, the plug 120 is lowered relative to the connector housing 11 so as to be tightly fitted with the connector housing 11. In this case, the plug 120 is lowered so that the front end portion 130a of the plug housing 130 is disposed slightly closer to the rear side than the rear end portion 18a of the abutting portion 18 of the connector housing 11 while each of the concave portions 131 opposes a corresponding one of the convex portion 31. When the plug 120 is placed on the connector housing 11, the plug 120 is moved toward the distal end of the connector housing 11 to be pressed more. With this operation, as described above in connection with FIG. 4, the front end portion 130a of the plug housing 130 is engaged with the rear end portion 18a of the abutting portion 18 of the connector housing 11, and the position of the plug 120 relative to the connector housing 11 is determined. In this case, the concave portions 131 are engaged with the convex portions 31, so that the front end portion 130a and the rear end portion 18a are in a multi-point contact state at three or more points. As a result, the position of the plug 120 relative to the connector housing 11 is determined with high precision with respect to the axial direction, the width direction of the hybrid cable 101 and the Z-axis direction.

It is to be noted that the plug 120 does not need to be lowered after it has been moved to be disposed above the connector housing 11. For example, the plug 120 is moved to be disposed at the rear side of the connector housing 11 so that the lower surface of the plug 120 is approximately parallel to and slightly above the upper surface of the connector housing 11, and thereafter, the plug 120 is moved toward the distal end of the connector housing 11. As a result, the front end portion 130a of the plug housing 130 is engaged with the rear end portion 18a of the abutting portion 18 of the connector housing 11. Moreover, when the plug 120 has been placed on the connector housing 11, the plug 120 is pressed toward the distal end of the connector housing 11, so that the position of the plug 120 relative to the connector housing 11 is fixed as described in connection with FIG. 4. In this case, the lock member 21 does not need to moved to the open position, illustrated in FIG. 1. Instead, the lock member 21 may be positioned where it overlaps the upper surface of the connector housing 11, illustrated in FIGS. 6A and 7A.

Moreover, for example, the plug 120 may be disposed at a position obliquely upward on the rear side of the connector housing 11, so that it assumes an attitude where the front end portion 130a of the plug housing 130 is oriented obliquely downward. In this case, the plug 120 is moved so that the front end portion 130a is moved obliquely downward, and the front end portion 130a is obliquely engaged with the rear end portion 18a of the abutting portion 18 of the connector housing 11 from the above. Then, the plug 120 is placed on the connector housing 11, and thereafter, the position of the plug 120 relative to the connector housing 11 is fixed in a manner similar to that described above.

In this way, since the attitude and the movement direction of the plug 120 or the attitude of the lock member 21 can be appropriately chosen when the plug 120 is engaged with the receptacle connector 1, it is possible to provide a high degree of freedom in the operation. For example, even when other components such as an electronic component, are mounted on the surroundings of the receptacle connector 1, by appropriately choosing the attitude and the movement direction of the plug 120, it is possible to easily perform the operation of tightly fitting the plug 120 to be engaged with the receptacle connector 1.

Moreover, since the convex portion 31 and the concave portion 131 capable of mutually engaging with each other have a semicircular shape and a triangular shape, respectively, even when the positioning of the plug 120 relative to the connector housing 11 is roughly carried out when the convex portion 31 is being inserted in the concave portion 131, they are automatically induced to be engaged with each other, so that the plug 120 and the connector housing 11 are accurately positioned relative to each other. Therefore, it is possible to easily perform the operation of tightly fitting the plug 120 to be engaged with the receptacle connector 1.

Furthermore, the convex portion 31 has a circular or sector-like shape, rather than an elongated shape like a pin, which is hard to be destroyed even when it has a fine dimension. Therefore, the convex portion 31 or other members might not be destroyed when the plug 120 is tightly fitted to be engaged with the receptacle connector 1.

Furthermore, when the position of the plug 120 relative to the connector housing 11 is fixed, the optical path conversion portion 161, as the plug-side optical connection portion, and the plug-side electric connection portion 153 of the plug 120 are positioned so as to oppose the optical connection portion 16 and the electric connection portion 17 of the connector housing 11, respectively. Moreover, the position in the thickness direction of the plug 120 is determined when the lower surface of the front crossbar portion 122 is brought into tight contact with the upper surface of the guide portion 14. In addition, the front end portion 130a of the plug 120 is engaged with the rear end portion 18a of the abutting portion 18 of the connector housing 11. Furthermore, the side surfaces in the vicinity of the rear end of the plug 120 are engaged with the rearward engagement protrusive walls of the connector housing 11. Therefore, the positional relationship between the plug 120 and the connector housing 11 can be stably maintained. Owing to these configurations, the positional relationship is not disturbed even upon receipt of an unexpected external force.

Subsequently, the position of the lock member 21 is changed from the open position: specifically, the lock member 21 is rotated in the clockwise direction in the drawing figures about the rotation shaft 13, so that the lock member 21 reaches a position above the plug 120 as illustrated in FIGS. 6A and 7A. When the lock member 21 is further rotated from this state, the position of the lock member 21 becomes as shown in FIGS. 6B and 7B, the distal end portions 27a of the latching arm parts 27 of the lock member 21 are brought into tight contact with the upper surfaces, that is, the tapered surfaces 15b of the lock projections 15a of the connector housing 11, as illustrated in FIG. 6E.

When the lock member 21 is further rotated by an operator so that the latching arm parts 27 are moved downward, the distal end portions 27a are slid along the tapered surfaces 15b, and thus, the latching arm parts 27 are displaced in a direction (rightward in the drawing figures) away from the rotation shaft 13. Then, the flexible portion 22 having elastic properties is expanded so that the bent portion 22a is elastically deformed, and thus, the straight portions 22b at both sides of the bent portion 22a are elastically displaced in a direction indicated by the arrow α in FIG. 6C. Moreover, as illustrated in FIG. 6F, when the distal end portions 27a of the latching arm parts 27 of the lock member 21 are brought into tight contact with the vertex portions of the lock projections 15a of the connector housing 11, the flexible portion 22 is in its most expanded state. As will be understood from FIGS. 7C and 7E, in such a state, since the pressing portion 25c of the lock member 21 is located closer to the rear side than the pressed portion 130c of the plug housing 130, the pressing portion 25c might not interfere with the plug housing 130.

Moreover, when the lock member 21 is further rotated from the states as illustrated in FIGS. 6C and 7C so that the latching arm parts 27 are further moved downward, the states as illustrated in FIGS. 6D and 7D are obtained. In this case, the distal end portions 27a are separated from the vertex portions of the lock projections 15a to be inserted into the concave latching portions 15c on the lower surface side of the lock projections 15a, as illustrated in FIG. 6G. Moreover, since the bent portion 22a restores to its original shape by a spring's restoring force so that the straight portions 22b at both sides of the bent portion 22a are displaced in a direction opposite to the direction of the arrow α, the flexible portion 22 is contracted to restore its original shape. Moreover, the distal end portions 27a are engaged with the lower surfaces of the lock projections 15a. Owing to this configuration, the lock member 21 is latched to the connector housing 11 at the closed position as illustrated in FIG. 6D so that the plug 120 is locked.

In addition, since the flexible portion 22 is extended and contracted to restore to its original shape, the pressing portion 25c is displaced in a direction opposite to the direction of the arrow α so that as illustrated in FIG. 7F, the pressing portion 25c makes tight contact with the pressed portion 130c of the plug housing 130, and the pressed portion 130c is pressed toward the distal end of the connector housing 11 by an urging force as a spring force of the bent portion 22a. Therefore, the entire body of the plug 120 is pressed toward the distal end of the connector housing 11 by the lock member 21. As a result, since the front end portion 130a and the rear end portion 18a are in a multi-point contact state at three or more points, the position and the attitude of the plug 120 relative to the connector housing 11 can be stably maintained.

In addition, since by the extendable/contractible of the flexible portion 22, the distal end portions 27a of the latching arm parts 27 receive a force exerted in a direction (leftward direction in the drawing figures) toward the rotation shaft 13, the engagement range between the distal end portions 27a and the lower surfaces of the lock projections 15a becomes the maximum, and thus, the lock reliability is improved. Moreover, when the lock member 21 is moved to the closed position, similar to the example illustrated in FIG. 6D, the connection portions 22c of the flexible portion 22 are brought into tight contact with the upper surfaces of the side wall portions 12. However, the connection portions 22c may not be brought into tight contact with the upper surfaces of the side wall portions 12.

In this manner, as illustrated in FIGS. 2, 6D and 7D, the plug 120 is locked by being tightly fitted with the receptacle connector 1, and thus, the hybrid cable 101 is firmly connected to the receptacle connector 1.

Moreover, when the lock member 21 is moved to the closed position, as illustrated in FIG. 2, the plug 120 is downwardly pressed by the first pressing portions 24a and the second pressing portions 25a, so that the lower surface of the plug 120 is pressed against the upper surface of the connector housing 11. As a result, the plug 120 becomes unable to move in the up-down direction, the front-rear direction, and the left-right direction, relative to the connector housing 11, and the plug 120 is completely engaged with the receptacle connector 1, so that the hybrid cable 101 is connected to the receptacle connector 1, and the hybrid cable 101 and the receptacle connector 1 are in the optically and electrically connected state. In this case, the connection pad portions 152 of the hybrid cable 101 press the corresponding contact portions 52 of the electric connection terminals 51 from the upper side. As a result, the electric connection terminals 51 are elastically deformed to exert a spring force, so that the contact portions 52 are pressed against the connection pad portions 152 by the spring force, and thus, the contact between the contact portions 52 and the connection pad portions 152 is securely maintained.

In addition, a balance between the pressing force of the first pressing portions 24a pressing the plug 120 and the pressing force of the second pressing portions 25a pressing the plug 120 can be appropriately adjusted. That is, the pressing force of the first pressing portions 24a may be set so as to be equal to the pressing force of the second pressing portions 25a, and any one of the pressing forces may be set so as to be stronger than the other force.

For example, the pressing force of the first pressing portions 24a may be set so as to be stronger than the pressing force of the second pressing portion 25a. In this case, since the pressing force of the first pressing portions 24a disposed close to the rotation shaft 13 being the center of rotation of the lock member 21 is stronger, it is possible to increase the pressing force for pressing the whole body of the plug 120 without needing to increase the force exerted by the operator, which is needed when the plug 120 is unlocked, as described later. That is, it is possible to increase the pressing force without needing to increase a load of the unlocking operation. Moreover, since the pressing force for pressing the portion close to the optical connection portion 16 is strong, it is possible to further increase the connection reliability. In addition, the pressing force of the second pressing portions 25a may be set so as to be stronger than the pressing force of the first pressing portions 24a.

Figure 8A:
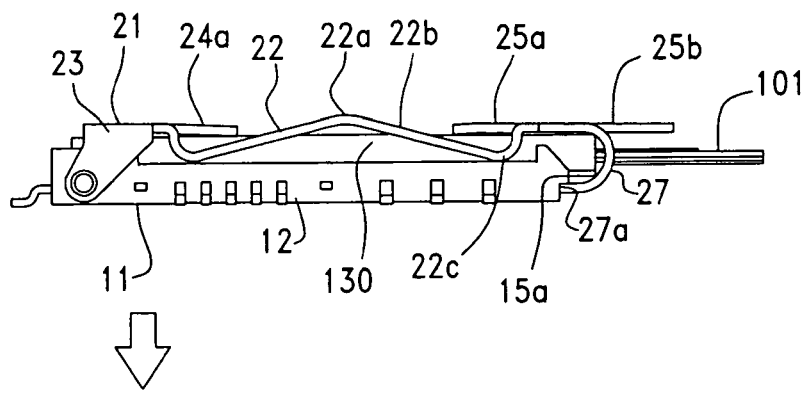
Figure 8B:
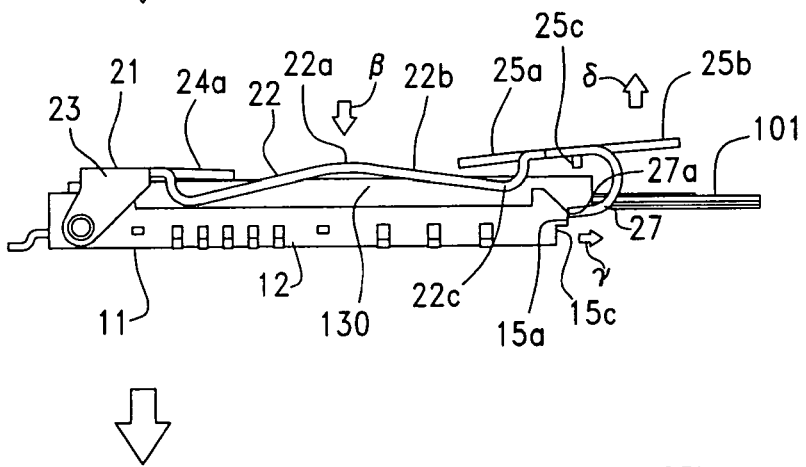
Figure 8C:
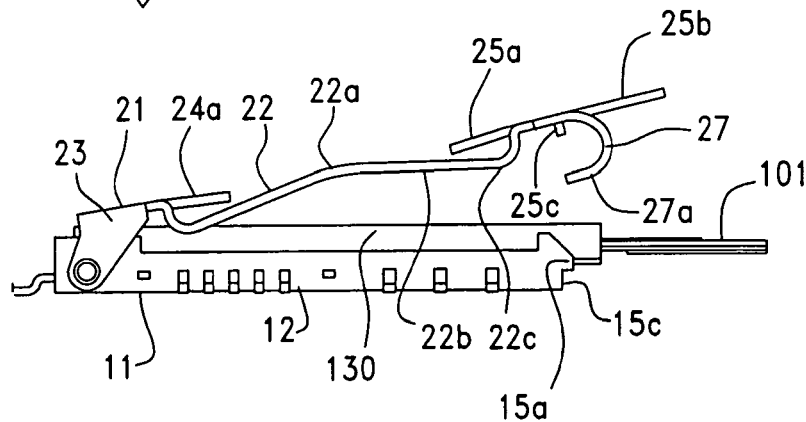

FIGS. 8A-8C illustrate a description of the operation of unlocking the plug 120 so that the plug 120 is removed from the receptacle connector 1 will be provided below. As illustrated in FIG. 8A, it is necessary to unlock the plug 120 in order to remove the plug 120 from engagement with the receptacle connector 1. In this case, the operator downwardly presses the bent portions 22a of the latching arm parts 27 with the operator. In this way, when the vertex portions of the bent portions 22a are displaced in a direction indicated by the arrow β in FIG. 8B, the bent portions 22a are elastically deformed so that the straight portions 22b at both sides of each bent portion 22a are elastically deformed in a direction indicated by the arrow α, and thus, the flexible portions 22 are expanded. As a result, the distal end portions 27a of the latching arm parts 27 are displaced in a direction away from the rotation shaft 13, i.e., in a direction indicated by the arrow γ in FIG. 8B, the distal end portions 27a are disengaged from the lower surfaces of the lock projections 15a. That is, the latched state between the distal end portions 27a of the latching arm parts 27 and the concave latching portions 15c is released.

Moreover, since the pressing portion 25c is moved in a direction indicated by the arrow γ, the pressing portion 25c is separated from the pressed portion 130c, and the plug 120 is released from the state where the entire body thereof is pressed toward the distal end of the connector housing 11 by the lock member 21.

In such a state, when the operator moves the operation portion 25b in a direction indicated by the arrow δ in FIG. 8B by the operator, the lock member 21 is rotated in the counter-clockwise direction about the rotation shaft 13, so that the latching arm parts 27 are moved upward. With this operation, the plug 120 is unlocked as illustrated in FIG. 8C.

As described above, since the latched state between the distal end portions 27a of the latching arm parts 27 and the concave latching portions 15c is released by only downwardly pressing the bent portions 22a, the lock state of the plug 120 can be easily released, and thus, the unlocking properties are extremely improved. Moreover, even when the spring force exerted by the latching arm parts 27 is increased in order to improve the lock reliability, since the latched state between the distal end portions 27a of the latching arm parts 27 and the concave latching portions 15c can be released by only downwardly pressing the bent portions 22a, the distal end portions 27a and the concave latching portions 15c are not worn away, and thus, a high durability can be provided.

Moreover, in the present embodiment, a description has been made for the case where the cable is configured as the hybrid cable 101 having integrated therewith the optical waveguide and the conductive wires 151, and the connector is configured as the hybrid connector having the optical connection portion 16 and the electric connection portion 17. However, the cable may be configured to include one the optical waveguide, and the connector may be configured to include one the optical connection portion 16.

In addition, in the present embodiment, a description has been made for the case where the convex portion 31 is formed in the rear end portion 18a of the abutting portion 18 of the connector housing 11, and the concave portion 131 is formed in the front end portion 130a of the plug housing 130. However, the convex portion 31 may be formed in the front end portion 130a of the plug housing 130, and the concave portion 131 may be formed in the rear end portion 18a of the abutting portion 18 of the connector housing 11. That is, the convex portion 31 may be formed in either one of the rear end portion 18a of the abutting portion 18 of the connector housing 11 or the front end portion 130a of the plug housing 130, and the concave portion 131 capable of being engaged with the convex portion 31 may be formed in the other one of the rear end portion 18a and the front end portion 130a.

As described above, in the present embodiment, the receptacle connector 1 includes the connector housing 11 configured to mount thereon the plug 120 having the hybrid cable 101 connected thereto, wherein: the connector housing 11 is provided with the abutting portion 18 having the rear end portion 18a configured to be engaged with the front end portion 130a of the plug 120; either one of the front end portion 130a or the rear end portion 18a has formed therein the convex portion 31 having the circular arc-shaped end portion 31a while having the flat portions 130b or 18b of the front end portion 130a or the rear end portion 18a being present at both sides thereof; the other one of the front end portion 130a and the rear end portion 18a has formed therein the concave portion 131 having two oblique side portions 131a, which are inclined in mutually opposite directions, while having the flat portions 130b or 18b of the front end portion 130a or the rear end portion 18a being present at both sides thereof; and the circular arc-shaped end portion 31a and/or the flat portions 130b or 18b at both sides of the convex portion 31 and the oblique side portion 131a and/or the flat portions 130b or 18b at both sides of the concave portion 131 make multi-point contact with each other when the front end portion 130a is engaged with the rear end portion 18a.

To this end, it is possible to position the plug 120 relative to the connector housing 11 in an easy and accurate manner. Moreover, the attitude and the movement direction of the plug 120 can be appropriately chosen when the plug 120 is mounted on the connector housing 11. Furthermore, even when the plug 120 is positioned relative to the connector housing 11, roughly carried out when the convex portion 31 is being inserted in the concave portion 131, they are automatically induced to be engaged with each other, so that the plug 120 and the connector housing 11 are accurately positioned relative to each other. Therefore, the operation can be performed easily with a high degree of freedom. Furthermore, owing to the multi-point contact between the front end portion 130a and the rear end portion 18a, it is possible to reduce the influence of the dimensional errors. Thus, the position and the attitude of the plug 120 relative to the connector housing 11 can be maintained with a high accuracy.

Moreover, the flat portions 130b or 18b at both sides of the circular arc-shaped end portion 31a and/or the convex portion 31 and the flat portions 130b or 18b at both sides of the oblique side portion 131a and/or the concave portion 131 make three or more point contact with each other. Owing to this configuration, the plug housing 130 is made unable to move in the X-axis direction, the Y-axis direction, and unable to rotate about the Z-axis direction.

Furthermore, the flat portions 130b or 18b at both sides of the convex portion 31 and the flat portions 130b or 18b at both sides of the concave portion 131 make one or more point contact with each other. Owing to this configuration, the position and the attitude of the plug 120 relative to the connector housing 11 can be stably maintained over a long period of time.

Furthermore, the convex portion 31 has a circular or sector-like shape, and the concave portion 131 has a triangular or trapezoidal shape or a generally V shape capable of allowing at least a portion of the convex portion 31 to be inserted therein. Owing to this configuration, even when the positioning of the plug 120 relative to the connector housing 11 is roughly carried out when the convex portion 31 is being inserted in the concave portion 131, they are automatically induced to be engaged with each other, so that the plug 120 and the connector housing 11 are accurately positioned relative to each other. Moreover, since the convex portion 31 has a circular or sector-like shape, rather than an elongated shape like a pin, which is hard to be destroyed even when it has a fine dimension, the convex portion 31 or other members might not be destroyed when the plug 120 is tightly fitted to be engaged with the receptacle connector 1.

In addition, the lock member 21 is attached to the connector housing 11 in an attitude-changeable state and is configured to be capable of locking the plug 120, and the lock member 21 includes the bent portion 22a and is provided with the flexible portion 22 configured to expand or contract in response to a change in an extent of bending of the bent portion 22a and the latching arm part 27 configured to be engaged with or disengaged from the connector housing 11 by the extension/contraction of the flexible portion 22. Owing to this configuration, it is possible to realize both easy unlocking properties and reliable locking properties. Thus, even when engagement and disengagement of the latching arm part 27 with and from the connector housing 11 is repeated, the latching arm part 27 and the connector housing 11 might not be worn away, and hence, a high durability is guaranteed.

Furthermore, the hybrid cable 101 is one which has laminated therein an optical waveguide and the conductive wires 151. The plug 120 is provided with the front crossbar portion 122 functioning as the positioned portion, the optical path conversion portion 161 functioning as the plug-side optical connection portion, and the plug-side electric connection portion 153. The connector housing 11 is provided with the guide portion 14 functioning as the positioning portion, the optical connection portion 16, and the electric connection portion 17. In addition, when the plug 120 is mounted on the connector housing 11, the guide portion 14 is engaged with the front crossbar portion 122, and the optical path conversion portion 161 and the plug-side electric connection portion 153 oppose the optical connection portion 16 and the electric connection portion 17.

Owing to this configuration, the plug 120 can be reduced in its entire size thereof, and it is thus possible to perform a wiring operation of the hybrid cable 101 in an extremely simple manner. Moreover, the plug 120 can be certainly engaged, and thus, it is possible to attain secure optical and electric connection with the hybrid cable 101. Furthermore, since the hybrid cable 101 is integrally formed by laminating the optical waveguide and the conductive wires 151, it is not necessary to wire the optical waveguide and the conductive wires 151 in an individual manner, and thus, the wiring operation is made easy.

While a preferred embodiment of the Present Invention is shown and described, it is envisioned that those skilled in the art may devise various modifications without departing from the spirit and scope of the foregoing Description and the appended claims.

What is claimed is:

1. An optical connector comprising:
   a connector housing configured to mount thereon a plug having a cable connected thereto, the cable having formed therein an optical waveguide:
   wherein the connector housing is provided with an abutting portion having a rear end portion configured to be engaged with a front end portion of the plug;
   either one of the front end portion or the rear end portion has formed therein a convex portion having a circular arc-shaped end portion;
   the other one of the front end portion or the rear end portion has formed therein a concave portion having two oblique side portions, which are inclined in mutually opposite directions; and
   the circular arc-shaped end portion and the oblique side portions are configured to come into point contact with each other at two or more contact points when the front end portion is engaged with the rear end portion.

2. The optical connector according to claim 1:
wherein the front end portion and the rear end portion have a flat portion, respectively; and
wherein the flat portion of the front end portion is capable of coming into point contact with the flat portion of the rear end portion at one or more contact point or points.

3. The optical connector according to claim 2:
wherein the convex portion has a circular or sector-like shape; and
wherein the concave portion has a triangular or trapezoidal shape or a generally V-letter shape capable of allowing at least a portion of the convex portion to be inserted therein.

4. The optical connector according to claim 3, wherein the front end portion comes into engagement with the rear end portion by being pressed toward the rear end portion.

5. The optical connector according to claim 4:
wherein the cable comprises a hybrid cable having laminated therein the optical waveguide and conductive wires;
wherein the plug is provided with a plug-side optical connection portion and a plug-side electric connection portion;
wherein the connector housing is provided with an optical connection portion and an electric connection portion; and
wherein when the plug is mounted on the connector housing, the plugside optical connection portion and the plug-side electric connection portion oppose the optical connection portion and the electric connection portion, respectively.

6. The optical connector according to claim 2, wherein the front end portion comes into engagement with the rear end portion by being pressed toward the rear end portion.

7. The optical connector according to claim 6:
wherein the cable comprises a hybrid cable having laminated therein the optical waveguide and conductive wires;
wherein the plug is provided with a plug-side optical connection portion and a plug-side electric connection portion;
wherein the connector housing is provided with an optical connection portion and an electric connection portion; and
wherein when the plug is mounted on the connector housing, the plugside optical connection portion and the plug-side electric connection portion oppose the optical connection portion and the electric connection portion, respectively.

8. The optical connector according to claim 2:
wherein a lock member is attached to the connector housing to be changeable in an attitude thereof and is configured to be capable of locking the plug;
wherein the lock member includes a bent portion and is provided with an extendable/contractible portion configured to extend or contract in response to a change in an extent of bending of the bent portion, a latched portion configured to be engaged with or disengaged from the connector housing by the extension/contraction of the extendable/contractible portion, and a pressing portion configured to be capable of pressing the plug toward the rear end portion in response to the contraction of the extendable/contractible portion.

9. The optical connector according to claim 8:
wherein the plug is configured to be mounted on the connector housing so that a lower surface thereof opposes an upper surface of the connector housing; and
wherein the lock member is provided with plug pressing portions capable of pressing an upper surface of the plug toward an upper surface of the connector housing.

10. The optical connector according to claim 9:
wherein the cable comprises a hybrid cable having laminated therein the optical waveguide and conductive wires;
wherein the plug is provided with a plug-side optical connection portion and a plug-side electric connection portion;
wherein the connector housing is provided with an optical connection portion and an electric connection portion; and
wherein when the plug is mounted on the connector housing, the plugside optical connection portion and the plug-side electric connection portion oppose the optical connection portion and the electric connection portion, respectively.

11. The optical connector according to claim 8:
wherein the cable comprises a hybrid cable having laminated therein the optical waveguide and conductive wires;
wherein the plug is provided with a plug-side optical connection portion and a plug-side electric connection portion;
wherein the connector housing is provided with an optical connection portion and an electric connection portion; and
wherein when the plug is mounted on the connector housing, the plugside optical connection portion and the plug-side electric connection portion oppose the optical connection portion and the electric connection portion, respectively.

12. The optical connector according to claim 2:
wherein the cable comprises a hybrid cable having laminated therein the optical waveguide and conductive wires;
wherein the plug is provided with a plug-side optical connection portion and a plug-side electric connection portion;
wherein the connector housing is provided with an optical connection portion and an electric connection portion; and
wherein when the plug is mounted on the connector housing, the plugside optical connection portion and the plug-side electric connection portion oppose the optical connection portion and the electric connection portion, respectively.

13. The optical connector according to claim 3:
wherein a lock member is attached to the connector housing to be changeable in an attitude thereof and is configured to be capable of locking the plug;
wherein the lock member includes a bent portion and is provided with an extendable/contractible portion configured to extend or contract in response to a change in an extent of bending of the bent portion, a latched portion configured to be engaged with or disengaged from the connector housing by the extension/contraction of the extendable/contractible portion, and a pressing portion configured to be capable of pressing the plug toward the rear end portion in response to the contraction of the extendable/contractible portion.

14. The optical connector according to claim 13:
wherein the plug is configured to be mounted on the connector housing so that a lower surface thereof opposes an upper surface of the connector housing; and wherein the lock member is provided with plug pressing portions capable of pressing an upper surface of the plug toward an upper surface of the connector housing.

15. The optical connector according to claim 14:
wherein the cable comprises a hybrid cable having laminated therein the optical waveguide and conductive wires;
wherein the plug is provided with a plug-side optical connection portion and a plug-side electric connection portion;
wherein the connector housing is provided with an optical connection portion and an electric connection portion; and
wherein when the plug is mounted on the connector housing, the plugside optical connection portion and the plug-side electric connection portion oppose the optical connection portion and the electric connection portion, respectively.

16. The optical connector according to claim 13:
wherein the cable comprises a hybrid cable having laminated therein the optical waveguide and conductive wires;
wherein the plug is provided with a plug-side optical connection portion and a plug-side electric connection portion;
wherein the connector housing is provided with an optical connection portion and an electric connection portion; and
wherein when the plug is mounted on the connector housing, the plugside optical connection portion and the plug-side electric connection portion oppose the optical connection portion and the electric connection portion, respectively.

17. The optical connector according to claim 1:
wherein the convex portion has a circular or sector-like shape; and
wherein the concave portion has a triangular or trapezoidal shape or a generally V-letter shape capable of allowing at least a portion of the convex portion to be inserted therein.

18. The optical connector according to claim 17:
wherein a lock member is attached to the connector housing to be changeable in an attitude thereof and is configured to be capable of locking the plug;
wherein the lock member includes a bent portion and is provided with an extendable/contractible portion configured to extend or contract in response to a change in an extent of bending of the bent portion, a latched portion configured to be engaged with or disengaged from the connector housing by the extension/contraction of the extendable/contractible portion, and a pressing portion configured to be capable of pressing the plug toward the rear end portion in response to the contraction of the extendable/contractible portion.

19. The optical connector according to claim 18:
wherein the plug is configured to be mounted on the connector housing so that a lower surface thereof opposes an upper surface of the connector housing; and
wherein the lock member is provided with plug pressing portions capable of pressing an upper surface of the plug toward an upper surface of the connector housing.

20. The optical connector according to claim 19:
wherein the cable comprises a hybrid cable having laminated therein the optical waveguide and conductive wires;
wherein the plug is provided with a plug-side optical connection portion and a plug-side electric connection portion;
wherein the connector housing is provided with an optical connection portion and an electric connection portion; and
wherein when the plug is mounted on the connector housing, the plugside optical connection portion and the plug-side electric connection portion oppose the optical connection portion and the electric connection portion, respectively.

21. The optical connector according to claim 17, wherein the front end portion comes into engagement with the rear end portion by being pressed toward the rear end portion.

22. The optical connector according to claim 21:
wherein the cable comprises a hybrid cable having laminated therein the optical waveguide and conductive wires;
wherein the plug is provided with a plug-side optical connection portion and a plug-side electric connection portion;
wherein the connector housing is provided with an optical connection portion and an electric connection portion; and
wherein when the plug is mounted on the connector housing, the plugside optical connection portion and the plug-side electric connection portion oppose the optical connection portion and the electric connection portion, respectively.

23. The optical connector according to claim 17:
wherein the cable comprises a hybrid cable having laminated therein the optical waveguide and conductive wires;
wherein the plug is provided with a plug-side optical connection portion and a plug-side electric connection portion;
wherein the connector housing is provided with an optical connection portion and an electric connection portion; and
wherein when the plug is mounted on the connector housing, the plugside optical connection portion and the plug-side electric connection portion oppose the optical connection portion and the electric connection portion, respectively.

24. The optical connector according to claim 18:
wherein the cable comprises a hybrid cable having laminated therein the optical waveguide and conductive wires;
wherein the plug is provided with a plug-side optical connection portion and a plug-side electric connection portion;
wherein the connector housing is provided with an optical connection portion and an electric connection portion; and
wherein when the plug is mounted on the connector housing, the plugside optical connection portion and the plug-side electric connection portion oppose the optical connection portion and the electric connection portion, respectively.

25. The optical connector according to claim 1, wherein the front end portion comes into engagement with the rear end portion by being pressed toward the rear end portion.

26. The optical connector according to claim 25:
wherein the cable comprises a hybrid cable having laminated therein the optical waveguide and conductive wires;

wherein the plug is provided with a plug-side optical connection portion and a plug-side electric connection portion;

wherein the connector housing is provided with an optical connection portion and an electric connection portion; and wherein when the plug is mounted on the connector housing, the plugside optical connection portion and the plug-side electric connection portion oppose the optical connection portion and the electric connection portion, respectively.

27. The optical connector according to claim 1:

wherein a lock member is attached to the connector housing to be changeable in an attitude thereof and is configured to be capable of locking the plug;

wherein the lock member includes a bent portion and is provided with an extendable/contractible portion configured to extend or contract in response to a change in an extent of bending of the bent portion, a latched portion configured to be engaged with or disengaged from the connector housing by the extension/contraction of the extendable/contractible portion, and a pressing portion configured to be capable of pressing the plug toward the rear end portion in response to the contraction of the extendable/contractible portion.

28. The optical connector according to claim 27:

wherein the plug is configured to be mounted on the connector housing so that a lower surface thereof opposes an upper surface of the connector housing; and wherein the lock member is provided with plug pressing portions capable of pressing an upper surface of the plug toward an upper surface of the connector housing.

29. The optical connector according to claim 28:

wherein the cable comprises a hybrid cable having laminated therein the optical waveguide and conductive wires;

wherein the plug is provided with a plug-side optical connection portion and a plug-side electric connection portion;

wherein the connector housing is provided with an optical connection portion and an electric connection portion; and wherein when the plug is mounted on the connector housing, the plugside optical connection portion and the plug-side electric connection portion oppose the optical connection portion and the electric connection portion, respectively.

30. The optical connector according to claim 27:

wherein the cable comprises a hybrid cable having laminated therein the optical waveguide and conductive wires;

wherein the plug is provided with a plug-side optical connection portion and a plug-side electric connection portion;

wherein the connector housing is provided with an optical connection portion and an electric connection portion; and wherein when the plug is mounted on the connector housing, the plugside optical connection portion and the plug-side electric connection portion oppose the optical connection portion and the electric connection portion, respectively.

31. The optical connector according to claim 1:

wherein the cable comprises a hybrid cable having laminated therein the optical waveguide and conductive wires;

wherein the plug is provided with a plug-side optical connection portion and a plug-side electric connection portion;

wherein the connector housing is provided with an optical connection portion and an electric connection portion; and wherein when the plug is mounted on the connector housing, the plugside optical connection portion and the plug-side electric connection portion oppose the optical connection portion and the electric connection portion, respectively.

* * * * *